(12) United States Patent
Chen et al.

(10) Patent No.: US 12,333,132 B2
(45) Date of Patent: Jun. 17, 2025

(54) METHOD, TERMINAL FOR ACQUIRING GESTURE DATA, AND STORAGE MEDIUM

(71) Applicant: GUANGDONG OPPO MOBILE TELECOMMUNICATIONS CORP., LTD., Dongguan (CN)

(72) Inventors: Ming Chen, Dongguan (CN); Li Zeng, Dongguan (CN); Xiaofan Zhang, Dongguan (CN); Weidong Zhong, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 203 days.

(21) Appl. No.: 18/231,965

(22) Filed: Aug. 9, 2023

(65) Prior Publication Data

US 2023/0384925 A1    Nov. 30, 2023

Related U.S. Application Data

(63) Continuation of application No. PCT/CN2022/077603, filed on Feb. 24, 2022.

(30) Foreign Application Priority Data

Mar. 24, 2021  (CN) .......................... 202110316214.X

(51) Int. Cl.
G06F 3/0488   (2022.01)
G06F 3/01     (2006.01)

(52) U.S. Cl.
CPC ............ G06F 3/0488 (2013.01); G06F 3/017 (2013.01)

(58) Field of Classification Search
CPC .............................. G06F 3/0488; G06F 3/017
See application file for complete search history.

(56) References Cited

U.S. PATENT DOCUMENTS 9,354,709 B1    5/2016 Heller et al.
9,619,024 B2 *  4/2017 Jiang ..................... G06F 3/0346
(Continued)

FOREIGN PATENT DOCUMENTS

CN    103941866 A    7/2014
CN    105094298 A    11/2015
(Continued)

OTHER PUBLICATIONS

Jialiang Fang et al., Research on gesture recognition based on sEMG and inertial sensor fusion, Oct. 1, 2018, IEEE 3d Advanced Information Technology—Electronic and Automation Control Conference, pp. 1-6 (Year: 2018).*

(Continued)

*Primary Examiner* — Tam T Tran
(74) *Attorney, Agent, or Firm* — BAYES PLLC

(57) ABSTRACT

In one aspect of the present disclosure, a method of acquiring gesture data is provided. The method may include acquiring a gesture signal. The method may include acquiring a feature value corresponding to the gesture signal. The method may include acquiring a signal state corresponding to a feature point based on the feature value, adding the feature value and the signal state to a gesture signal set. The method may include acquiring all feature values and all signal states between a gesture start point and a gesture end point in the phase of acquiring the gesture data from the gesture signal set. The method may include generating signal change information based on the all feature values and the all signal states. The method may include identifying the signal change information as a signal data segment of a target gesture in response to the signal change information meeting signal verification information.

20 Claims, 12 Drawing Sheets

(56) References Cited

U.S. PATENT DOCUMENTS

| | | |
|---|---|---|
| 2006/0136846 A1 | 6/2006 | Im et al. |
| 2013/0294651 A1* | 11/2013 | Zhou .................. G06V 40/28 382/103 |
| 2014/0232642 A1 | 8/2014 | Lefebvre et al. |
| 2015/0109202 A1 | 4/2015 | Ataee et al. |
| 2015/0370333 A1 | 12/2015 | Ataee et al. |
| 2019/0025933 A1 | 1/2019 | Wang et al. |

FOREIGN PATENT DOCUMENTS

| | | |
|---|---|---|
| CN | 105573545 A | 5/2016 |
| CN | 105807903 A | 7/2016 |
| CN | 108196668 A | 6/2018 |
| CN | 110266876 A | 9/2019 |
| CN | 108431756 B | 9/2020 |
| CN | 112363622 A | 2/2021 |
| CN | 112418089 A | 2/2021 |
| CN | 113031775 A | 6/2021 |

OTHER PUBLICATIONS

MD Ferdous Wahid et al., An Efficient Approach to Recognize Hand Gestures Using Machine-Learning Algorithms, Mar. 1, 2018, IEEE 4th Middle East Conference on Biomedical Engineering, pp. 171-176 (Year: 2018).*

Extended European Search Report, European Patent Application No. 22773974.5, mailed Mar. 22, 2024 (38 pages).

Chinese First Office Action, Chinese Application No. 202110316214.X, mailed Mar. 21, 2022 (13 pages).

Notification to Grant Patent Right for Invention, Chinese Application No. 202110316214.X, mailed Dec. 5, 2022 (6 pages).

International Search Report, International Application No. PCT/CN2022/077603, mailed May 7, 2022 (15 pages).

* cited by examiner

S101 acquiring a gesture signal collected by a sensor, acquiring a feature value corresponding to the gesture signal

S102 acquiring a signal state corresponding to a feature point based on the feature value, adding the feature value and the signal state to a gesture signal set

S103 acquiring all feature values and all signal states between a gesture start point and a gesture end point in the phase of acquiring the gesture data from the gesture signal set, generating signal change information based on the all feature values and the all signal states

S104 identifying the signal change information as a signal data segment of a target gesture in response to the signal change information meeting signal verification information

FIG.3 terminal sensor  → processor → gesture data

FIG.4

METHOD, TERMINAL FOR ACQUIRING GESTURE DATA, AND STORAGE MEDIUM

CROSS-REFERENCE TO RELATED APPLICATIONS

This application is a continuation of International Patent Application No. PCT/CN2022/077603, filed Feb. 24, 2022, which claims the benefit of priority to Chinese Application No. 202110316214.X, filed Mar. 24, 2021, both of which are herein incorporated by reference in their entireties.

TECHNICAL FIELD

This disclosure relates to computer technical field, and more particularly, to a method, terminal, and non-transitory storage medium.

BACKGROUND

With the development of science and technology, the development of terminals is becoming more and more rapid. Therefore, improving the convenience for users to use terminals has become a focus of attention of users. Among them, gesture is an important way of human-computer interaction. Gesture not only conforms to human interaction habits, but also has the characteristics of simplicity, efficiency, and directness. The user usually inputs different gestures in the terminal, and the sensor in the terminal can collect gesture data during the gesture operation, so that the terminal can recognize the gesture and perform an operation corresponding to the gesture.

SUMMARY

Embodiments of the present disclosure provide a method, terminal, and non-transitory storage medium.

In a first aspect, a method for acquiring gesture data is provided according to some embodiments of the present disclosure. The method may include acquiring a gesture signal collected by a sensor, and acquiring a feature value corresponding to the gesture signal. The method may include acquiring a signal state corresponding to a feature point based on the feature value. The method may include adding the feature value and the signal state to a gesture signal set. The feature point may be a feature point in a phase of acquiring the gesture data based on the feature value. The method may include acquiring all feature values and all signal states between a gesture start point and a gesture end point in the phase of acquiring the gesture data from the gesture signal set. The method may include generating signal change information based on the all feature values and the all signal states. The method may include identifying the signal change information as a signal data segment of a target gesture in response to the signal change information meeting signal verification information.

In a second aspect, a terminal is provided according to some embodiments of the present disclosure. The terminal may include one or more processors. The terminal may include one or more memories configured to store instructions. The instructions which, when executed by the one or more processors, cause the terminal to acquire a gesture signal collected by a sensor. The instructions which, when executed by the one or more processors, cause the terminal to acquire a feature value corresponding to the gesture signal. The instructions which, when executed by the one or more processors, cause the terminal to acquire a signal state corresponding to a feature point based on the feature value. The instructions which, when executed by the one or more processors, cause the terminal to add the feature value and the signal state to a gesture signal set. The instructions which, when executed by the one or more processors, cause the terminal to acquire all feature values and all signal states between a gesture start point and a gesture end point in the phase of acquiring the gesture data from the gesture signal set. The instructions which, when executed by the one or more processors, cause the terminal to generate signal change information based on the all feature values and the all signal states. The instructions which, when executed by the one or more processors, cause the terminal to identify the signal change information as a signal data segment of a target gesture in response to the signal change information meeting signal verification information.

In a third aspect, a non-transitory computer-readable storage medium is provided according to some embodiments of the present disclosure. The computer-readable storage medium may store instructions. The instructions, which when executed by a processor of a terminal, may cause the terminal to acquire a gesture signal collected by a sensor, and acquire a feature value corresponding to the gesture signal. The instructions, which when executed by a processor of a terminal, may cause the terminal to acquire a signal state corresponding to a feature point based on the feature value. The instructions, which when executed by a processor of a terminal, may cause the terminal to add the feature value and the signal state to a gesture signal set. The feature point may be a feature point in a phase of acquiring the gesture data based on the feature value. The instructions, which when executed by a processor of a terminal, may cause the terminal to acquire all feature values and all signal states between a gesture start point and a gesture end point in the phase of acquiring the gesture data from the gesture signal set. The instructions, which when executed by a processor of a terminal, may cause the terminal to generate signal change information based on the all feature values and the all signal states. The instructions, which when executed by a processor of a terminal, may cause the terminal to identify the signal change information as a signal data segment of a target gesture in response to the signal change information meeting signal verification information.

BRIEF DESCRIPTION OF DRAWINGS

In order to more clearly illustrate the technical solutions in the embodiments of the present disclosure or the prior art, the following may briefly introduce the figures that need to be used in the description of the embodiments or the prior art. Obviously, the accompanying figures in the following description are only embodiments of the present disclosure. Those skilled in the art can also obtain other figures based on these figures without inventive work.

FIG. 3 illustrates a schematic flow chart of a method for acquiring gesture data provided by an embodiment of the present disclosure;

FIG. 4 illustrates a system architecture diagram of a method for acquiring gesture data according to an embodiment of the present disclosure;

DETAILED DESCRIPTION

Figure 1:
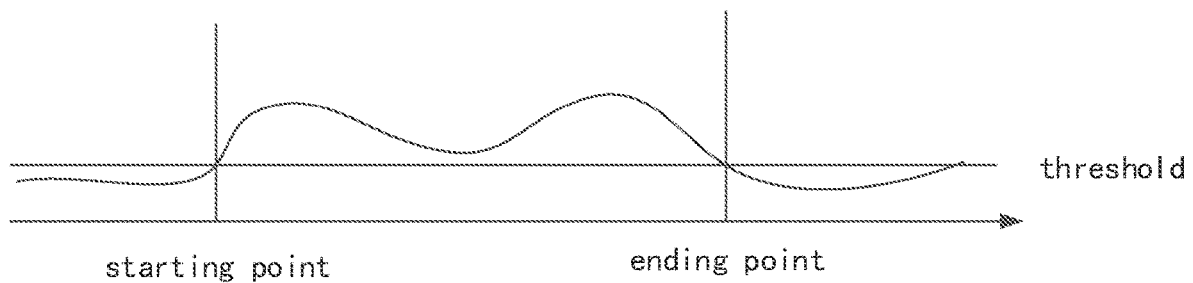
FIG. 1 illustrates a schematic background diagram of a method for acquiring gesture data according to an embodiment of the present disclosure.

The following may clearly and completely describe the technical solutions in the embodiments of the present disclosure with reference to the figures in the embodiments of the present disclosure. As is readily understood, the described embodiments are only some of the embodiments of the present disclosure, not all of embodiments. Based on the embodiments in present disclosure, all other embodiments obtained by persons of ordinary skill in the art without making inventive efforts belong to the scope of protection of present disclosure.

In the description of the present disclosure, it should be understood that the terms "first", "second" and the like are used for description purposes only, and cannot be interpreted as indicating or implying relative importance. In the description of the present disclosure, it should be noted that, unless otherwise specified and limited, "including" and "having" and any variations thereof are intended to cover non-exclusive inclusion. For example, a process, method, system, product or device comprising a series of steps or units is not limited to the listed steps or units, but optionally also includes unlisted steps or units, or optionally further includes other steps or units inherent in these processes, methods, products or devices. Those of ordinary skill in the art can understand the specific meanings of the above terms in the present disclosure in specific situations. In addition, in the description of the present disclosure, unless otherwise specified, "plurality" means two or more. "And/or" describes the association relationship of associated objects, indicating that there may be three types of relationships, for example, A and/or B may indicate: A exists alone, A and B exist simultaneously, and B exists alone. The character "/" generally indicates that the contextual objects are an "or" relationship.

With the increasing maturity of the Internet-of-Things (IoT) technology, human-computer interaction may be particularly important for the interaction and control between terminals. Gesture interaction is an important way of human-computer interaction. In the sensor-based gesture interaction, the terminal can acquire gesture data during gesture operation through its own sensor, so that the user can control the terminal with gestures. Gesture interaction has relatively low power-consumption and cost, is not affected by lighting conditions, and can be applied to different terminals. Based on the accuracy of data acquired by the sensor and the computing capability of the terminal itself, the accuracy of gesture recognition by the terminal can be determined. The sensor-based gesture interaction process mainly includes two states: gesture detection and segmentation, and gesture recognition. Gesture detection and segmentation is mainly used to segment the complete sensor data during gesture operation from the continuous data stream.

In some embodiments, the methods by which the terminal can acquire gesture data may include, e.g., manual control and segmentation methods, single-threshold threshold detection methods, multi-threshold threshold detection methods, detection methods based on rising and falling edges, model-based detection methods, and bottom-up detection and segmentation methods, etc. In some embodiments, the manual control and segmentation method refers to intercepting and segmenting gesture data through user operations. For example, the user can mark the gesture start point by pressing the control, and prohibit using the terminal within a preset time period before and after the gesture operation. The terminal can use the data between the starting point and the ending point of the gesture as gesture data. Therefore, the gesture control and segmentation methods need to be controlled manually, which increases the gesture data acquisition steps and reduces the user's gesture operation experience.

FIG. 1 illustrates a schematic background diagram of a method for acquiring gesture data according to some embodiments of the present disclosure. As shown in FIG. 1, the terminal can set a start threshold and an end threshold, and use a single-threshold detection method to acquire gesture data. However, if the threshold is set too small, there may be noise data in the gesture data acquired by the terminal. If the threshold is set too large, the starting point and the ending point of the gesture cannot be accurately determined, making the gesture data acquired by the terminal inaccurate and reducing the user's gesture operation experience.

Figure 2:
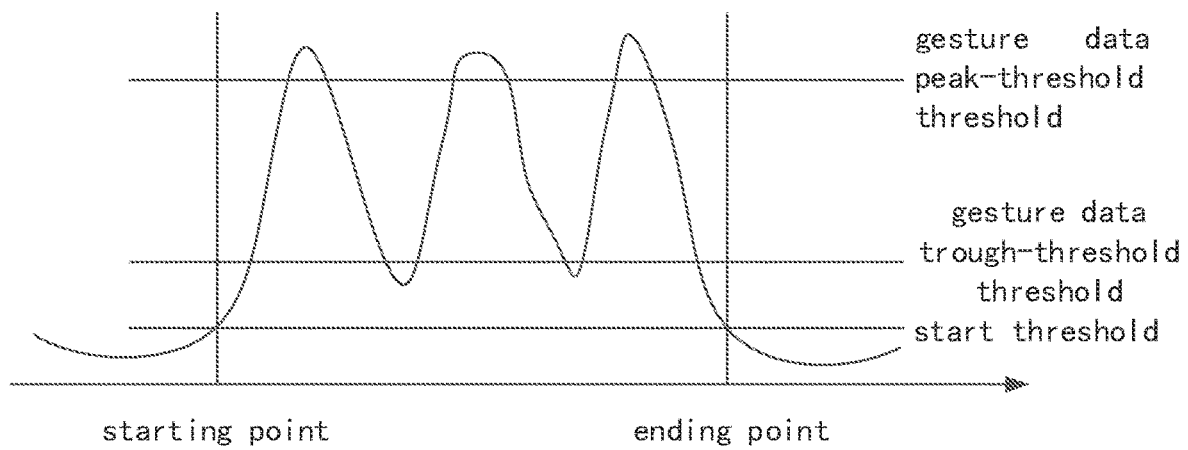
FIG. 2 illustrates a schematic background diagram of a method for acquiring gesture data according to an embodiment of the present disclosure.

FIG. 2 illustrates a schematic background diagram of a method for acquiring gesture data according to some embodiments of the present disclosure. As illustrated in FIG. 2, the terminal may acquire gesture data by a multi-threshold threshold detection method. For example, the terminal may set a start threshold, an end threshold, a gesture data peak-threshold threshold, and a gesture data trough-threshold threshold. In some embodiments, the start threshold may be the same as the end threshold, or may be different. The start threshold and the end threshold illustrated in FIG. 2 are the same. When the gesture starts slowly, the terminal may discard the data in the initial phase of the gesture, and may be unable to accurately detect the gesture start point and gesture end point. When the gesture data fluctuates sharply, the gesture data may be divided into multiple pieces of data, and the gesture termination point may not be accurately determined. This limits gesture data acquisition accuracy and reduces the user's gesture operation experience.

In some embodiments, the terminal may also acquire gesture data by using a rising and falling edge detection method. For example, the terminal can calculate the rising edge occurrence time T1 and the falling edge occurrence time T2 of the sensor, respectively. The terminal may use the rising edge occurrence time T1 and the falling edge occurrence time T2 as the starting point and the ending point of the gesture data, thereby obtaining the gesture data. However, when the range of gesture changes is small, the terminal may not obtain the starting point and the ending point of the gesture data by using the rising and falling edge detection method. There again, this limits the gesture data acquisition accuracy and reduces the user's gesture operation experience.

In some embodiments, when the terminal uses the model detection method to acquire gesture data, it needs to manually mark the gesture data, and this method requires a large amount of calculation, which reduces the convenience of acquiring gesture data and the user's gesture operation experience. The terminal may also adopt a top-down segmentation method to acquire gesture data by merging gesture data from top to bottom. When the terminal adopts the top-down segmentation method, it needs to acquire the gesture data before and after the current gesture operation, and acquire gesture data and non-gesture data, which may be increase the steps of acquiring gesture data, reduce the convenience of acquiring gesture data, and reduce the user's gesture operation experience. The present application provides a method for acquiring gesture data, which can improve the convenience of acquiring gesture data while improving the accuracy of acquiring gesture data.

The present disclosure may be described in detail below in conjunction with specific embodiments.

In some embodiments, as illustrated in FIG. 3, a method for acquiring gesture data is proposed. The method may be implemented by relying on computer instructions and can run on an apparatus for acquiring gesture data including a sensor. The computer instructions may be integrated in the application, or run as an independent utility application.

In some embodiments, the device for acquiring gesture data may be a terminal with a sensor function, which includes but is not limited to: wearable devices, handheld devices, personal computers, tablet computers, vehicle-mounted devices, smart phones, computing devices, or devices connected to wireless modems other processing equipment, etc. Terminal equipment can be called different names in different networks, such as: user equipment, access terminal, subscriber unit, subscriber station, mobile station, mobile termination, remote station, remote terminal, mobile device, user terminal, terminal, wireless communication devices, user agents or user devices, cellular phones, cordless phones, personal digital assistants (PDAs), terminal devices in 5G networks or future evolution networks, etc.

As illustrated in FIG. 3, at least one embodiment provides the method for acquiring gesture data, applied to a terminal.

For instance, referring to FIG. 3, at block S101, the terminal may acquire a gesture signal collected by a sensor and acquires a feature value corresponding to the gesture signal.

In some embodiments, the sensor may include a transducer. The transducer may include a detection device that can sense the measured information, and convert the sensed information into electrical signals or other required forms of information output according to certain rules to meet the information requirements of transmitting, processing, storage, display, recording and control. The terminal may include a variety of built-in sensors, e.g., such as gyroscopic sensors, magnetic sensors, acceleration sensors, direction sensors, pressure sensors, temperature-sensitive sensors, angular velocity sensors, and the like. In practical applications, the sensor may monitor whether there is a gesture input on the display screen of the terminal. When the sensor detects that there is a gesture input, the sensor can collect gesture signals during the gesture operation.

Optionally, the gesture signal changes along with the gesture input by the user. The gesture performed by the user in the three-dimensional space may be consistent with the gestures pre-stored in the terminal, so that the terminal can perform corresponding operations when recognizing the gesture input by the user. The gestures stored in the terminal may be set based on the terminal's factory settings. In some embodiments, the gestures stored in the terminal may also be set by the terminal based on a user's gesture setting instruction, or may be modified by the terminal based on a user's gesture modification instruction.

In some embodiments, the gesture signal may refer to the gesture signal collected by the sensor when the user performs a spatial gesture operation in the three-dimensional space. The spatial gesture may refer to the gesture action performed in the three-dimensional space when the user performs the gesture operation. The gesture signal may correspond to a spatial gesture. The gesture signal may not specifically refer to a certain fixed gesture-signal. When the spatial gesture input by the user changes, the gesture signal may also change. When the type of sensor changes, the gesture signal may also change.

Optionally, the feature value may refer to a feature value corresponding to the gesture signal. The feature value may represent values of the gesture signals. The feature value may correspond to the gesture signal, so when the gesture signal changes, the feature value also changes.

In some embodiments, when the user performs a spatial gesture operation, the sensor may collect gesture signals during the gesture operation. In some embodiments, the number of gesture signals collected by the sensor may include one or more gesture signals. FIG. 4 illustrates a system architecture diagram of a method for acquiring gesture data according to an embodiment of the present disclosure. As illustrated in FIG. 4, the terminal may acquire the gesture signal collected by the sensor. In other words, the processor of the terminal can receive the gesture signal collected by the sensor. When the terminal acquires the gesture signal collected by the sensor, the terminal may acquire the feature value of the gesture signal. For example, when the terminal acquires gesture signals collected by multiple sensors, the terminal may acquire feature values corresponding to the gesture signals.

At block S102, the terminal may acquire a signal state corresponding to a feature point based on the feature value and add the feature value and the signal state to a gesture signal set.

In some embodiments, the signal state may refer to a state corresponding to the feature point, and the signal state may represent the state of the feature point during the gesture input process. The signal state may include, but is not limited to, an initial state, a gesture input state, a gesture state, a gesture end state, a noise state, a gesture end determination state, and the like. In some embodiments, one feature point may correspond to one signal state.

In some embodiments, the feature point may include the feature point of the feature value in the phase of acquiring the gesture data. A characteristic value may correspond to a characteristic point, and the characteristic point may include, but is not limited to, a time point, a moment point, and the like. The feature point may be acquired based on the time record of the terminal itself, or may be the feature point corresponding to the feature value determined by the terminal based on the current absolute time.

Optionally, the gesture signal set may refer to a set formed by summarizing feature values and signal states corresponding to feature points. The gesture signal set may include at least one feature value and a signal state corresponding to the feature point. The gesture signal set does not specifically refer to a fixed set. When the gesture signal changes, the feature value of the gesture signal may also change. When the signal state corresponding to the feature point obtained based on the feature value changes, the gesture signal set may also change.

In some embodiments, when the terminal acquires the gesture signal collected by the sensor, the terminal may acquire the feature value of the gesture signal. When the terminal obtains the feature value of the gesture signal, the terminal may obtain the feature point corresponding to the feature value. When the terminal acquires the feature point, the terminal may acquire a signal state corresponding to the feature point based on the feature value. When the terminal obtains the signal state corresponding to the feature point, the terminal may add the feature value and signal state to the gesture signal set.

At block S103, the terminal acquires all feature values and all signal states between a gesture start point and a gesture end point in the phase of acquiring the gesture data from the gesture signal set and generates signal change information based on the all feature values and the all signal states.

In some embodiments, the phase of acquiring gesture data may refer to a phase in which the terminal acquires gesture data. The feature values and signal states included in the gesture signal set correspond to all gesture signals collected by the sensor. Since not all gesture signals are gesture signals corresponding to the target gesture, the terminal may obtain the gesture start point and gesture end point in the phase of acquiring the gesture data.

Optionally, the gesture start point may be used to indicate the start point of the phase of acquiring the gesture data. In other words, the gesture start point may be used to indicate the point at which the gesture starts to be input. The gesture start point may be determined based on the user's gesture input operation. The terminal may determine the gesture start point based on a magnitude relationship between a feature value of the gesture signal and a feature threshold.

In some embodiments, the gesture end point may be used to indicate the end point of the phase of acquiring the gesture data. That is to say, the gesture end point may be used to indicate the point at which the gesture ends the input. The gesture end point may not specifically refer to a fixed end point; and the gesture end point may be determined based on the user's gesture input operation.

In some embodiments, the signal change information may be used to represent the overall signal change information in the phase of acquiring gesture data. The signal change information corresponds to all feature values and all signal states between the gesture start point and the gesture end point in the phase of acquiring the gesture data. The signal change information may not specifically refer to certain fixed signal change information. When the gesture start point or the gesture end point changes, the signal change information may also change.

In some embodiments, when the terminal acquires the gesture signal collected by the sensor, the terminal may acquire the feature value of the gesture signal. When the terminal obtains the feature value of the gesture signal, the terminal may obtain the feature point corresponding to the feature value. When the terminal acquires the feature point, the terminal may acquire a signal state corresponding to the feature point based on the feature value. When the terminal obtains the signal state corresponding to the feature point, the terminal may add the feature value and signal state to the gesture signal set. The terminal may obtain the gesture start point and the gesture end point in the phase of acquiring the gesture from the gesture signal set. The terminal may obtain all feature values and all signal states between the gesture start point and the gesture end point. The terminal may generate signal change information based on all feature values and all signal states between the gesture start point and the gesture end point. That is, the terminal may obtain the signal change information in the phase of acquiring the gesture data.

At block S104, the terminal identifies the signal change information as a signal data segment of a target gesture in response to the signal change information meeting signal verification information.

In some embodiments, the signal verification information may refer to verifying whether the signal change information in the phase of acquiring the gesture data is consistent with the signal state change of the target gesture. The signal verification information is information stored in the terminal for verifying signal change information. The signal verification information may be set by the terminal in-factory, or by the terminal based on a user's setting instruction, or by the terminal based on update information pushed by the server.

Optionally, when the terminal determines that the spatial gesture input by the user is a complete gesture based on the signal change information, the terminal may determine that the complete gesture is a target gesture. The target gesture may be, for example, a gesture action formed by the user's limbs in the three-dimensional space according to the movement track. The target gesture does not specifically refer to a fixed gesture, and the target gesture may be determined based on a gesture input by the user.

In some embodiments, the signal data segment refers to the state of acquiring the gesture data, and the gesture signal included in the signal data segment is the gesture signal corresponding to the target gesture.

In some embodiments, when the terminal acquires the signal state change information in the phase of acquiring the gesture data, the terminal may detect whether the signal change information meets the signal verification information. When the terminal detects that the signal change information meets the signal verification information, the terminal can determine that the signal change information is the signal data segment of the target gesture. That is, the terminal can identify the data between the gesture start point and the gesture end point in the phase of acquiring gesture data as the gesture data corresponding to the target gesture.

In some embodiments of the present disclosure, the feature value corresponding to the gesture signal is obtained by acquiring the gesture signal collected by the sensor, and the signal state corresponding to the feature point is obtained based on the feature value, and the feature value and signal state are added to the gesture signal set in the gesture signal set, all feature values and all signal states between the gesture start point and gesture end point in the phase of acquiring the gesture data can be obtained, and signal change information can be generated based on all feature values and all signal states. When the signal change information meets the signal verification information, it may be determined that the signal change information is the signal data segment of the target gesture. Therefore, when acquiring gesture data, there may be no need for human control, which reduces the inaccuracy of acquiring gesture data based only on the threshold. Moreover, there may be no need to manually label gesture data on the model, and the target gesture can be acquired only based on the signal change information corresponding to the target gesture collected by the sensor. The signal data segment can improve the accuracy of acquiring the gesture data while improving the convenience of acquiring the gesture data, thereby improving the user's gesture operation experience. In addition, the solution in the embodiment of the present disclosure has a limited number of calculations, which can reduce the duration and improve the efficiency of acquiring the gesture data.

Figure 5:
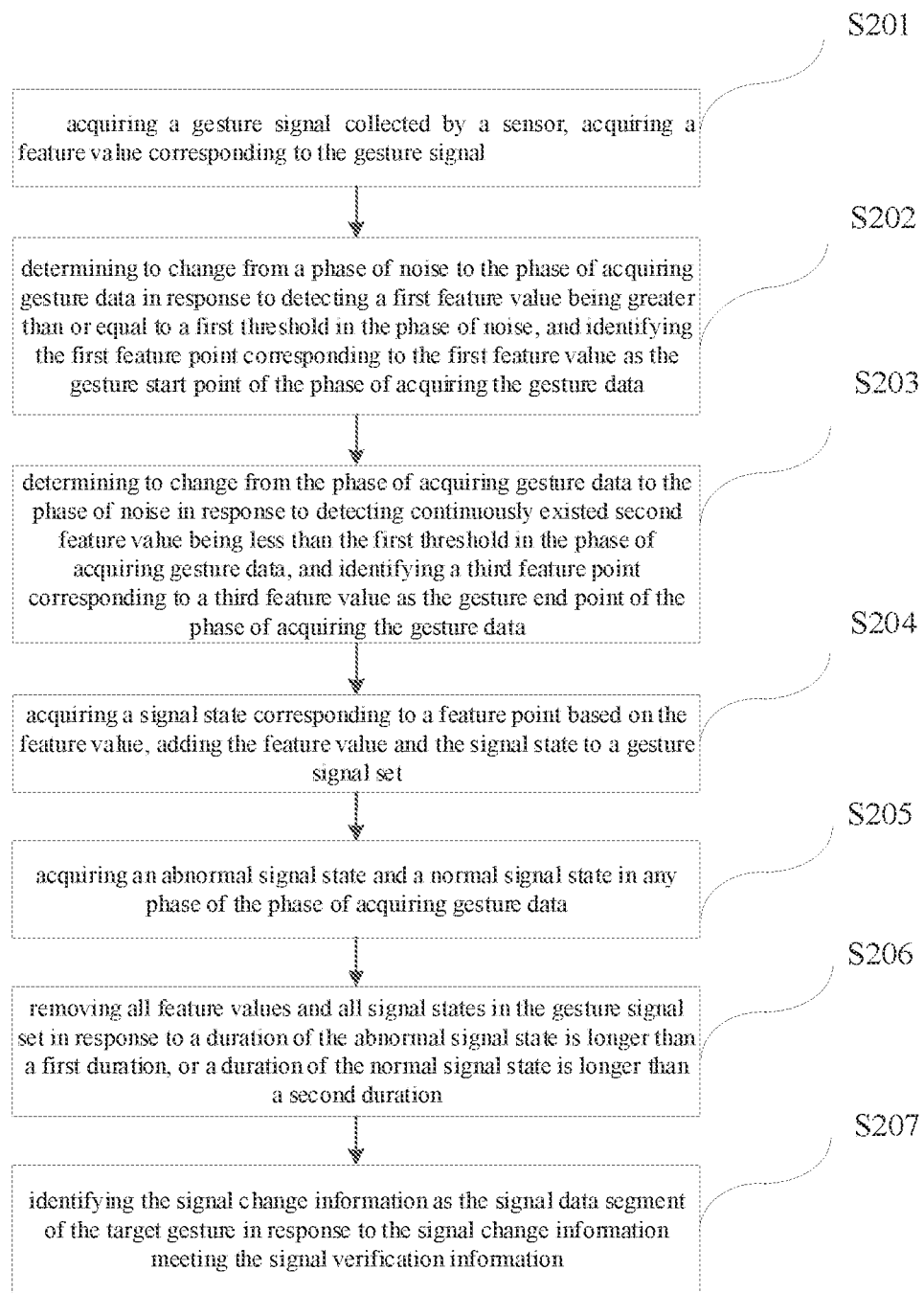
FIG. 5 illustrates a schematic flowchart of a method for acquiring gesture data provided by an embodiment of the present disclosure.

FIG. 5 illustrates a schematic flowchart of a method for acquiring gesture data provided by some embodiments of the present disclosure, applied to a terminal.

At block S201, the terminal acquires a gesture signal collected by a sensor and acquires a feature value corresponding to the gesture signal.

In some embodiments, due to differences in gestures input by different users, the terminal may receive a user's frequency setting instruction before collecting gestures. The terminal may set the sampling frequency based on the frequency setting instruction, which can improve the accuracy of acquiring the gesture data. The frequency setting instructions include, but are not limited to, voice frequency setting instructions, click frequency setting instructions, timing frequency setting instructions, and the like. The frequency setting instruction can be, for example, a voice frequency setting instruction. For example, when the voice frequency setting instruction can be, e.g., "set the sampling frequency of the sensor to 100 MHz," the terminal may set the sampling frequency of the sensor to 100 MHz. That is, the terminal's sensor may collect a gesture signal at predetermined intervals, e.g., 10 ms. The timing frequency setting instruction may be, for example, an instruction to set different time periods or different time points corresponding to different frequencies.

In some embodiments, when the terminal acquires the feature value of the gesture signal, the terminal may acquire the feature function of the gesture signal at the current moment. In some embodiments, the terminal may acquire the feature value of the gesture signal at the current moment based on the feature function. Therefore, the terminal can acquire feature values corresponding to all gesture signals collected by the sensor.

Figure 6:
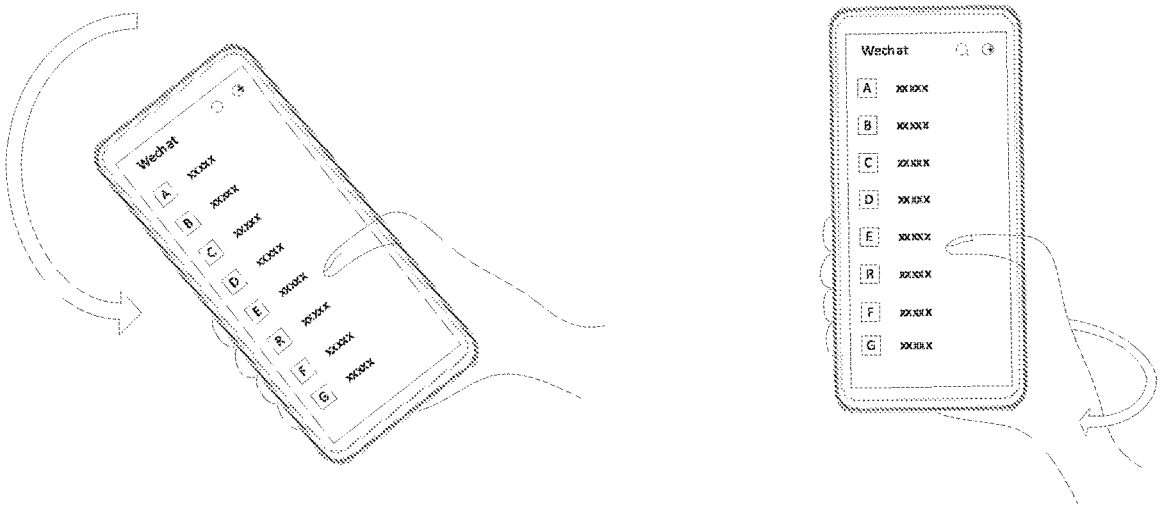
FIG. 6 illustrates a schematic diagram of a scene of a method for acquiring gesture data according to an embodiment of the present disclosure.

Optionally, FIG. 6 illustrates a schematic diagram of a scene of a method for acquiring gesture data according to some embodiments of the present disclosure. As illustrated in FIG. 6, when the sensor detects that the user inputs a target gesture, the sensor can collect gesture signals. The terminal can obtain the gesture signal collected by the sensor. The target gesture is a spatial gesture.

At block S202, the terminal determines to change from a phase of noise to the phase of acquiring gesture data in response to detecting a first feature value being greater than or equal to a first threshold in the phase of noise. At block S202, the terminal may identify the first feature point corresponding to the first feature value as the gesture start point of the phase of acquiring the gesture data.

Figure 7:
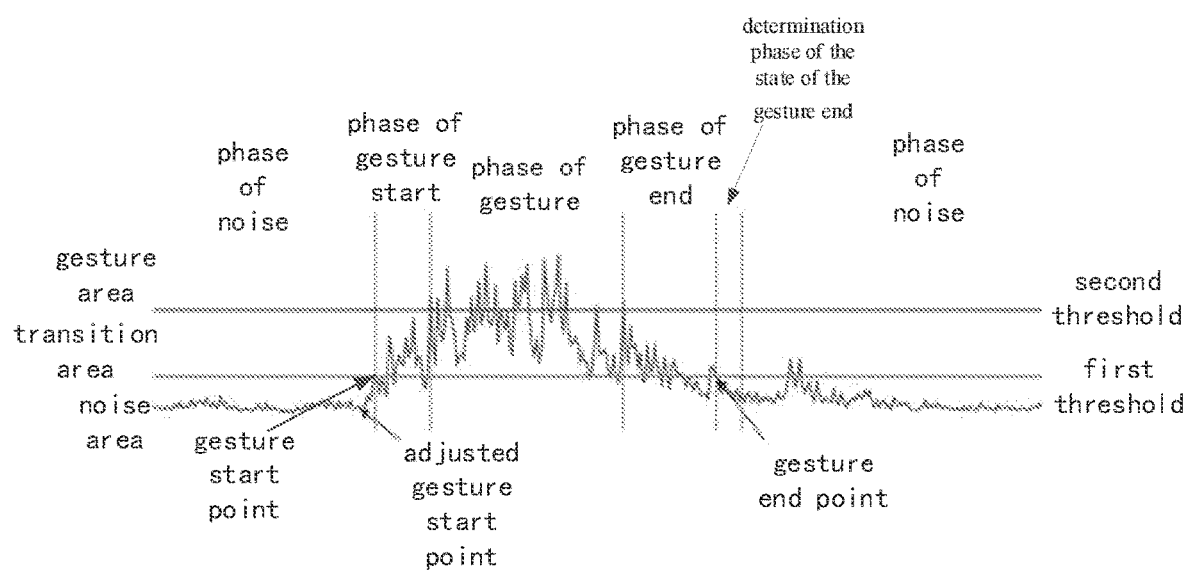
FIG. 7 illustrates a schematic diagram of an example of gesture data in a method for acquiring gesture data according to an embodiment of the present disclosure.

In some embodiments, FIG. 7 illustrates a schematic diagram of gesture data in a method for acquiring gesture data according to some embodiments of the present disclosure. A phase of noise refers to a phase that includes only noise data. In the phase of noise, the gesture data collected by the sensor may be composed of terminal noise and environmental noise, etc. The phase of noise in this block may refer to a phase in which there is only one first feature value greater than or equal to the first threshold among the feature values corresponding to the gesture signal collected by the sensor before the user inputs the gesture.

In some embodiments, when in the phase of noise, the terminal may detect whether the first feature value is greater than or equal to the first threshold. The first feature value refers to the feature value corresponding to the gesture signal collected by the sensor acquired by the terminal in the phase of noise. The first feature value does not specifically refer to a certain fixed feature value, and the first feature value may be used to represent the feature value obtained in the phase of noise. The first threshold refers to a critical value corresponding to the feature value. The first threshold does not refer to a certain fixed threshold. For example, the terminal may change the first threshold based on a user's threshold change instruction. The threshold change instruction includes, but is not limited to, a speech threshold change instruction, a click threshold change instruction, a timing threshold change instruction, etc. The threshold change instruction may be determined by the user based on the acquisition result of historical gesture data, etc. For example, when the user determines that the first threshold is relatively large based on historical gesture data, the user may input a voice threshold change instruction of "reducing the first threshold to the third threshold." The terminal may change the first threshold based on the voice threshold change instruction. Wherein, the third threshold is smaller than the first threshold.

In some embodiments, when the terminal detects that the first feature value is greater than or equal to the first threshold during the phase of noise, the terminal may determine to switch from the phase of noise to the phase of acquiring gesture data. The terminal may determine the first feature point corresponding to the first feature value as the gesture start point in the phase of acquiring the gesture data.

In some embodiments, the first threshold may be an "a" threshold. When the terminal detects that there is a feature value of A greater than the "a" threshold during the phase of noise, the terminal may determine to switch from the phase of noise to the phase of acquiring gesture data. The terminal may determine the A1 feature point corresponding to the A feature value as the gesture start point in the phase of acquiring the gesture data.

In some embodiments, when the terminal detects that the presence feature value is greater than or equal to the first threshold in the initial phase, the terminal may also switch from the initial phase to the phase of acquiring the gesture data. The initial phase refers to the phase where no gesture signal is acquired.

In some embodiments, the phase of acquiring the gesture data includes a phase of the gesture start, a phase of the gesture and a phase of the gesture end, the gesture start point is the start point of the phase of the gesture start, and the gesture end point is the end point of the phase of the gesture end. The phase of gesture start is used to indicate the initial phase of input of the target gesture, the phase of gesture is used to indicate the input phase of the target gesture, and the phase of gesture end is used to indicate the end input phase of the target gesture. The signal verification information stored in the terminal may, for example, switch from a phase of the gesture start to a phase of the gesture, and then switch from a phase of the gesture to a phase of the gesture end.

In some embodiments, the phase of the gesture start may refer to, e.g., a signal data segment whose feature value is greater than the first threshold and less than the second threshold. A phase of the gesture may include, e.g., a signal data segment whose feature value fluctuates strongly above and below the second threshold value. The phase of the gesture end may refer to, for example, a signal data segment whose feature value is greater than the first threshold and smaller than the second threshold after the phase of the gesture. It should be noted that any phase in the phase of acquiring the gesture data does not only include the feature value defined above, and when the feature value does not meet the feature value requirements of the current phase, the terminal needs to detect the feature value.

For example, when the feature value V is less than the first threshold at the phase of the gesture start, the terminal may detect whether there is a feature value greater than the first threshold within a preset time period after the V1 feature point. If the terminal detects that the X feature value is greater than the first threshold, the terminal can determine that the V feature value belongs to the phase of the gesture start, and the terminal can add the V feature value and the signal state corresponding to the V1 feature point to the gesture signal set. If the terminal detects that there is no feature value of X greater than the first threshold, the terminal can determine that the feature value of V does not belong to the phase of the gesture start, and the terminal can clear the feature value and signal state in the gesture data set.

In some embodiments, when the phase of noise is switched to the phase of acquiring the gesture data, when the terminal detects that there is a first feature value greater than or equal to the first threshold in the phase of noise, it may determine that the phase of noise is switched to the phase of the gesture start. The first feature point corresponding to the first feature value is determined as the start point of the phase of the gesture start. The start point of the phase of the gesture start is the gesture start point of the phase of acquiring the gesture data.

In some embodiments, the first threshold may be an "a" threshold. When the terminal detects that the feature value A is greater than the "a" threshold during the phase of noise, the terminal may determine to switch from the phase of noise to the phase of the gesture start. The terminal may determine the A1 feature point corresponding to the A feature value as the start point of the phase of the gesture start.

In some embodiments, when the gesture is initiated, the terminal may detect whether there is a fourth feature value greater than or equal to the second threshold. In some embodiments, the second threshold is greater than the first threshold. The first threshold may be used to detect the start point and end point of the phase of acquiring the gesture data, while the second threshold may be used to detect whether there is a gesture action corresponding to the target gesture. The second threshold may not specifically refer to a certain fixed threshold. The second threshold may, for example, be changed based on a user's threshold setting instruction. When detecting that there is a fourth feature value greater than or equal to the second threshold in the phase of the gesture start, the terminal may determine to switch from the phase of the gesture start to the phase of the gesture. Moreover, the terminal may determine the fourth feature point (e.g., corresponding to the fourth feature value) as the start point of the phase of the gesture. In some embodiments, the start point of the phase of the gesture is the end point of the phase of the gesture start. The fourth feature point may be, for example, the feature point corresponding to the first feature value greater than or equal to the second threshold determined by the terminal based on the feature value when the gesture signal corresponding to the target gesture is collected.

In some embodiments, the second threshold may be a "b" threshold. When in the phase of gesture start, and the terminal detects that the fourth feature value S is greater than the "b" threshold, the terminal can switch the phase of the gesture start to the phase of the gesture, and the terminal can set the S1 feature point corresponding to the S feature value as the start point of the phase of the gesture. The S1 feature point may be the end point of the phase of the gesture start.

At block S203, the terminal determines to change from the phase of acquiring gesture data to the phase of noise in response to detecting continuously existed second feature value being less than the first threshold in the phase of acquiring gesture data. At block S203, the terminal may identify a third feature point corresponding to a third feature value as the gesture end point of the phase of acquiring the gesture data.

In some embodiments, the second feature value refers to a feature value that is continuously smaller than the first threshold in the phase of acquiring the gesture data, and the second feature value does not specifically refer to a fixed feature value, and the second feature value may include, for example, a plurality of feature values. The third feature value is the last feature value greater than or equal to the first threshold before the second feature point corresponding to the second feature value. The third feature value does not specifically refer to a certain fixed feature value. For example, when the target gesture input by the user changes, the third feature value may also change.

In some embodiments, when in the phase of acquiring gesture data, the terminal may detect whether the second feature value persists and is smaller than the first threshold. When the terminal detects that the second feature value persists and is smaller than the first threshold, the terminal may determine to switch from the phase of acquiring the gesture data to the phase of noise. The terminal may determine the third feature point as the gesture end point in the phase of acquiring the gesture data. In some embodiments, the third feature point is the feature point corresponding to the last feature value greater than or equal to the first threshold before the second feature point corresponding to the second feature value. The terminal may detect whether the second feature value is less than the first threshold, which can reduce the inaccuracy associated with gesture end point determination based on the threshold. This can also improve the accuracy of gesture start point and the gesture end point determination, as well as the accuracy of acquiring the gesture data. In addition, when the terminal determines the gesture start and the gesture end point, there may be no need for manual marking or manual operation steps. This may reduce the number of gesture data acquisition steps, thereby simplifying the gesture data acquisition process.

Optionally, the first threshold may be, for example, an "a" threshold. After switching from the phase of noise to the phase of acquiring gesture data, when the terminal detects that the B feature value is less than the "a" threshold, the terminal may determine to switch from the phase of acquiring the gesture data to the phase of noise. The terminal may determine the W1 feature point corresponding to the W feature value as the gesture end point in the phase of acquiring the gesture data. In some embodiments, the W feature value may be, for example, the last feature value greater than a threshold before the B1 feature point corresponding to the B feature value.

In some embodiments, when the terminal switches from the phase of noise to the phase of acquiring the gesture data, the terminal may switch from the phase of noise to the phase of the gesture start. When the fourth feature value is greater than or equal to the second threshold in the phase of the gesture start, the terminal may determine to switch from the phase of the gesture start to the phase of the gesture. When the phase of the gesture that the sixth feature value is less than the second threshold, the terminal determines to switch from the phase of the gesture to the phase of the gesture end. Here, the terminal may also determine the fifth feature point corresponding to the fifth feature value as the end point of the phase of the gesture. In some embodiments, the end point of the phase of the gesture is the start point of the phase of the gesture end, and the second threshold is greater than the first threshold.

In some embodiments, the fifth feature point is the feature point corresponding to the fifth feature value. The fifth feature value may be the last feature value greater than or equal to the second threshold before the sixth feature value corresponding to the sixth feature point. In other words, The fifth feature point may be the last feature value corresponding to the feature value greater than or equal to the second threshold before the sixth feature value corresponding to the sixth feature point.

In some embodiments, the second threshold may be a "b" threshold. When in the phase of the gesture start and the terminal detects that the fourth feature value S is greater than the "b" threshold, the terminal may switch the phase of the gesture start to the phase of the gesture. In the phase of the gesture, when the terminal detects that the F feature value is continuously smaller than the "b" threshold, the terminal may switch the phase of the gesture to the phase of the gesture end. The terminal may determine the E1 feature point corresponding to the E feature value as the end point of the phase of the gesture. In some embodiments, the E feature value may be, for example, the last feature value greater than the "b" threshold before the F1 feature point corresponding to the F feature value.

In some embodiments, when it is detected in the phase of the gesture that the sixth feature value persists and is smaller than the second threshold, the terminal determines to switch from the phase of the gesture to the phase of the gesture end. When it is detected in the phase of the gesture end that the second feature value persists and is smaller than the first threshold, the terminal may determine to switch from the phase of the gesture end to the phase of noise. In other words, the terminal may determine to switch from the phase of acquiring the gesture data to the phase of noise. At this time, the terminal may determine the third feature point corresponding to the third feature value as the end point of the phase of the gesture end, the third feature point is a feature point corresponding to a last feature value greater than or equal to the first threshold before a second feature point corresponding to a second feature value. In some embodiments, the phase where the second feature value is located may be a determination phase of the state of the gesture end. The determination phase of the state of the gesture end may be a part of the phase of noise.

At block S204, the terminal acquires a signal state corresponding to a feature point based on the feature value, and adds the feature value and the signal state to a gesture signal set.

In some embodiments, at any stage of the phase of acquiring gesture data, the terminal can acquire the signal state corresponding to the feature point based on the feature value, and add the feature value and signal state to the gesture signal set. This may limit the number of times gesture data is discarded during the multiple-threshold detection process, thereby increasing the accuracy of gesture data acquisition.

Figure 8:
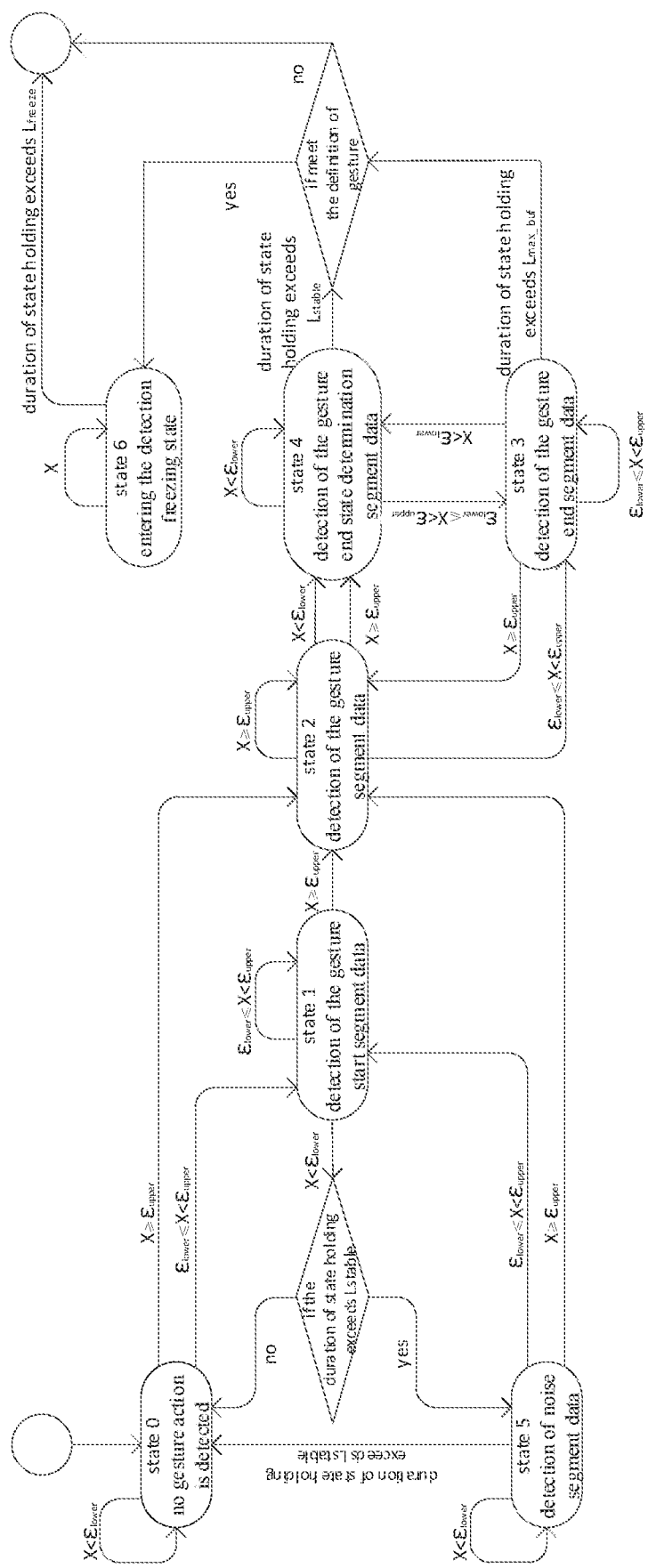
FIG. 8 illustrates a schematic diagram of switching a gesture detecting state according to an embodiment of the present disclosure.

Optionally, when the terminal acquires the signal state corresponding to the feature point based on the feature value, the terminal may set the signal state corresponding to the feature point. Moreover, the terminal may switch the signal state based on the signal states of two adjacent feature points. FIG. 8 illustrates a schematic diagram of switching a gesture detection state according to an embodiment of the present disclosure. As shown in FIG. 8, state 0 represents the initial state, no gesture action is detected; state 1 represents the detection of the gesture start segment data; state 2 represents the detection of the gesture segment data; state 3 represents the detection of the gesture end segment data; state 4 represents the detection of the gesture end state determination segment data; state 5 represents the detection of noise segment data; state 6 represents entering the detection freezing state; $\varepsilon_{lower}$ represents the first threshold; $\varepsilon_{upper}$ represents the second threshold; $L_{stable}$ represents the duration of the gesture end state determination segment data; $L_{max\_buf}$ represents the duration of the gesture end segment data; $L_{freeze}$ represents the duration of the detection of the freezing state; $L_{start}$ represents the start point adjustment value corresponding to the start point; x represents the feature value.

In some embodiments, the terminal may switch signal states based on the signal states of two adjacent feature points. For example, the O feature point and the P feature point are two adjacent feature points. The signal state corresponding to the O feature point may be, e.g., a gesture start state. The signal state corresponding to the P feature point may be, e.g., a noise state. Therefore, when the terminal determines the signal state of the P feature point, the signal state may be switched from the gesture start state to the noise state. Therefore, at least one signal state may be included in any phase of the phase of acquiring the gesture data.

In some embodiments, when the terminal detects that the first feature value is smaller than the first threshold during the phase of the gesture start, the terminal sets the signal state corresponding to the first feature point as the noise state. In the phase of gesture start, when the first feature value is greater than or equal to the first threshold and smaller than the second threshold, the terminal may set the signal state corresponding to the first feature point as the phase of the gesture start. In the phase of the gesture start, when the first feature value is greater than or equal to the second threshold, the terminal may set the signal state corresponding to the first feature point as the phase of the gesture. The first feature point corresponding to the first feature value is the starting point of the phase of the gesture.

When the terminal acquires the signal state corresponding to the first feature point at the phase of the gesture start, the terminal may add the first feature value and the signal state corresponding to the first feature point to the gesture signal set.

Optionally, the first threshold may be, for example, an "a" threshold. The second threshold may be, for example, a "b" threshold. When the terminal detects that the first feature value A feature value is less than the "a" threshold value during the phase of the gesture start, the terminal can set the signal state corresponding to the A1 feature point as the noise state. Moreover, when the terminal detects that the first feature value A feature value is less than the "a" threshold value during the phase of the gesture start, the terminal may add the A feature value and the noise state corresponding to the A1 feature point to the gesture signal set.

When the terminal detects that the first feature value A is greater than the "a" threshold and less than the "b" threshold during the phase of the gesture start, the terminal can set the signal state corresponding to the A1 feature point as the phase of the gesture start. Moreover, when the terminal detects that the first feature value A is greater than the "a" threshold and less than the "b" threshold during the phase of the gesture start, the terminal may add the A feature value and the gesture start state corresponding to the A1 feature point to the gesture signal set.

When the terminal detects that the first feature value A feature value is greater than the "b" threshold value during the phase of the gesture start, the terminal can set the signal state corresponding to the A1 feature point as the gesture state. Moreover, when the terminal detects that the first feature value A feature value is greater than the "b" threshold value during the phase of the gesture start, the terminal may add the A feature value and the gesture corresponding to the A1 feature point to the gesture signal set.

In some embodiments, in the phase of gesture, when detecting that the third feature value is smaller than the first threshold, the terminal may set the signal state corresponding to the third feature point as the noise state. In the phase of gesture, when it is detected that the third feature value is greater than or equal to the first threshold and less than the second threshold, the terminal may set the signal state corresponding to the third feature point as the gesture end state. In the phase of the gesture, when it is detected that the third feature value is greater than or equal to the second threshold, the terminal may set the signal state corresponding to the third feature point as the gesture state. When the terminal acquires the signal state corresponding to the third feature point in the phase of the gesture, the terminal may add the third feature value and the signal state corresponding to the third feature point to the gesture signal set.

Optionally, the first threshold may be, for example, an "a" threshold. The second threshold may be, for example, a "b" threshold. During the phase of gesture, when the terminal detects that the third feature value W is less than the "a" threshold, the terminal can set the signal state corresponding to the W1 feature point as the noise state. Here, the terminal may add the W feature value and the noise state corresponding to the W1 feature point to the gesture signal set.

During the phase of gesture, when the terminal detects that the third feature value W feature value is greater than the "a" threshold and less than the "b" threshold value, the terminal may set the signal state corresponding to the W1 feature point as the gesture end state. Moreover, the terminal may add the W feature value and the W1 feature point corresponding gesture start state to the gesture signal set.

During the phase of gesture, when the terminal detects that the third feature value A feature value is greater than the "b" threshold value, the terminal may set the signal state corresponding to the W1 feature point as the gesture state. Moreover, the terminal may add the W feature value and the gesture state corresponding to the W1 feature point to the gesture signal set.

In some embodiments, in the phase of gesture end stage, when it is detected that the sixth feature value is smaller than the first threshold, the terminal may set the signal state corresponding to the sixth feature point as the noise state. In the phase of the gesture end, when it is detected that the sixth feature value is greater than or equal to the first threshold and less than the second threshold, the terminal may set the signal state corresponding to the sixth feature point as the gesture end state.

In the phase of the gesture end, when it is detected that the sixth feature value is greater than or equal to the second threshold, the terminal may set the signal state corresponding to the sixth feature point as the gesture state, and the sixth feature point corresponding to the sixth feature value is the starting point of the phase of the gesture end. When the terminal acquires the signal state corresponding to the sixth feature point at the phase of the gesture end, the terminal may add the sixth feature value and the signal state corresponding to the sixth feature point to the gesture signal set.

Optionally, the first threshold may be, for example, an "a" threshold. The second threshold may be, for example, an "b" threshold. In the phase of gesture end, when the terminal detects that the sixth feature value F is less than the "a" threshold, the terminal may set the signal state corresponding to the F1 feature point as the noise state. Moreover, the terminal may add the F feature value and the noise state corresponding to the F1 feature point to the gesture signal set.

In the phase of the gesture end, when the terminal detects that the sixth feature value F feature value is greater than the "a" threshold and less than the "b" threshold value, the terminal may set the signal state corresponding to the F1 feature point as the gesture end state. Moreover, the termina may add the F feature value and F1 feature point corresponding to the gesture end state to the gesture signal set. In the gesture end stage, when the terminal detects that the sixth feature value A is greater than the "b" threshold, the terminal can set the signal state corresponding to the F1 feature point as the gesture state. Moreover, the terminal may set the F feature value and the gesture state corresponding to the F1 feature point to the gesture signal set.

At block S205, the terminal acquires an abnormal signal state and a normal signal state in any phase of the phase of acquiring gesture data.

In embodiments, the abnormal signal state may not specifically refer to a fixed signal state, the abnormal signal state is a signal state not corresponding to any phase, and the normal signal state is a signal state corresponding to any stage. For example, when any phase in the phase of acquiring the gesture data is the phase of the gesture start, the abnormal signal state in the phase of the gesture start is the signal state that is not the phase of the gesture start, and the normal signal state in the phase of the gesture start is the signal state that is the signal state of the phase of the gesture start.

In some embodiments, when the signal state corresponding to the feature point based on the feature value is obtained, and the feature value and signal state are added to the gesture signal set, the terminal may obtain the abnormal signal state and normal signal in any phase of the phase of acquiring the gesture data.

Optionally, after the terminal obtains the signal state corresponding to the feature point based on the feature value, and adds the feature value and signal state to the gesture signal set, the terminal can, for example, the terminal may obtain the abnormal signal state noise state and the normal signal state gesture of the phase of the gesture start.

At block S206, the terminal removes all feature values and all signal states in the gesture signal set in response to a duration of the abnormal signal state is longer than a first duration, or a duration of the normal signal state is longer than a second duration.

In some embodiments, when the terminal obtains the abnormal signal state and the normal signal state in any phase of the phase of acquiring gesture data, the terminal may obtain the duration of the abnormal signal state and the duration of the normal signal state. When the terminal determines that the duration of the abnormal signal state is longer than the first duration, or the duration of the normal signal state is longer than the second duration, the terminal may clear all feature values and all signal states in the gesture signal set. By detecting the abnormal signal state and the duration of the normal signal state in any phase of the phase of acquiring gesture data, the need to segment the gesture data when it is determined that the gesture data is abnormal may be eliminated, while at the same time increasing the accuracy of acquiring the gesture data.

In some embodiments, the first duration is a duration corresponding to the duration of the abnormal signal state. The second duration is a duration corresponding to the duration of the normal signal state. The first duration and the second duration do not specifically refer to a certain fixed duration, and the first duration and the second duration may be set based on a user's duration setting instruction, etc.

Optionally, the values of the first duration and the second duration in each phase may be different. By way of example and not limitation, the first duration in the phase of the gesture start may be 0.2 seconds. The first duration in the phase of the gesture may be, e.g., 0.6 seconds. The first duration in the phase of the gesture end may be, e.g., 0.3 seconds.

In some embodiments, the first duration in the phase of the gesture start may be 0.2 seconds, while the second duration may be 0.5 seconds, for example. After the terminal obtains the signal state corresponding to the feature point based on the feature value, and adds the feature value and signal state to the gesture signal set, the terminal can obtain the abnormal signal state noise state and the normal signal state of the phase of the gesture start. When the terminal obtains the abnormal signal state noise state and the normal signal state gesture initial state of the phase of the gesture start, the terminal may obtain the duration of the noise state and the duration of the normal signal state. The duration for which the terminal acquires the noise state may be 0.3 seconds and the duration for which the terminal acquires the normal signal state may be 0.4 seconds, in some non-limiting examples. When the duration of the abnormal signal state is longer than the first duration of 0.2 seconds, the terminal may clear all feature values and all signal states in the gesture signal set.

In some embodiments, when the signal state corresponding to the feature point in any phase of the acquiring the gesture data is an abnormal signal state, the terminal can time and/or obtain the abnormal signal state. When the duration of the abnormal signal state is longer than the first duration, the terminal may clear all feature values and all signal states in the gesture signal set.

At block S207, the terminal identifies the signal change information as the signal data segment of the target gesture in response to the signal change information meeting the signal verification information.

In some embodiments, since the gesture start point in an actual application is earlier than the gesture signal collected by the sensor, the terminal adjusts the gesture start point to improve the accuracy of acquiring the gesture data. When the signal change information meets the signal verification information, the terminal may acquire the start point adjustment value corresponding to the gesture start point. When the terminal obtains the start point adjustment value corresponding to the gesture start point, the terminal may adjust the gesture start point based on the start point adjustment value to obtain an adjusted gesture start point. The terminal may determine the state change information between the adjusted the gesture start point and the gesture end point as the signal data segment of the target gesture.

In some embodiments, the starting point adjustment value corresponding to the gesture start point can be set based on the user's adjustment instruction. For example, when the terminal determines that the recognition accuracy of the last target gesture is lower than the preset accuracy, the terminal may adjust the starting point adjustment value based on the user's adjustment instruction.

In some embodiments, the gesture start point may correspond to the 3rd second, and the ending point of the gesture may correspond to the 4th second. For example, when the signal change information meets the information of switching from the phase of the gesture start to the phase of the gesture, and then from the phase of the gesture to the phase of the gesture end, the terminal may obtain the start point adjustment value corresponding to the gesture start point, which may be, for example, 0.08 seconds. When the terminal acquires the start point adjustment value corresponding to the gesture start point, the terminal may adjust the gesture start point based on the start point adjustment value, and obtain the adjusted gesture start point as the 2.92th second. The terminal may determine the state change information between the adjusted gesture start point at the 2.92th second and the gesture ending point at the 4th second as the signal data segment of the target gesture.

In some embodiments, when the signal change information meets the signal verification information, the terminal may also adjust the gesture termination point. This may improve the accuracy of acquiring the gesture data.

In some embodiments, the gesture signal collected by the sensor is acquired, and the feature value corresponding to the gesture signal is acquired. When the phase of noise that the first feature value is greater than or equal to the first threshold, the terminal may determine to switch the phase of noise to the phase of acquiring the gesture data, and determine the first feature point as the starting point of the phase of acquiring the gesture data.

When the second feature value persists during phase of acquiring the gesture data and is less than the first threshold, the terminal may determine to switch the phase of acquiring the gesture data to the phase of noise. Moreover, the terminal may determine the third feature point corresponding to the third feature value as the gesture end point in the phase of acquiring the gesture data. This may reduce inaccuracies in determining the gesture end point based on the threshold. This may increase the accuracy of gesture start and the gesture end point determination, while also increasing the accuracy of gesture data acquisition. In addition, when the terminal determines the gesture start point and gesture end point, manual operations by the user may not be required, which can reduce the number of operations associated with acquiring gesture data. This may improve the convenience of acquiring gesture data.

Moreover, the signal state corresponding to the feature point may be obtained based on the feature value. When the feature value and signal state are added to the gesture signal set, the signal state of the feature point in any stage of the phase of acquiring gesture data can be set by the terminal. This may reduce inaccuracies in determining gesture end point based on the direct threshold value, thereby increasing the accuracy of acquired gesture data.

In addition, the terminal may detect the abnormal signal state and the duration of the normal signal state in any stage of the phase of acquiring the gesture data. This may improve the accuracy of acquiring the gesture data without dividing the gesture data when it is determined to be abnormal. Finally, when the signal change information meets the signal verification information, the signal change information is determined as the signal data segment of the target gesture. This may reduce inaccuracies associated with acquiring gesture data based on the threshold.

Figure 9:
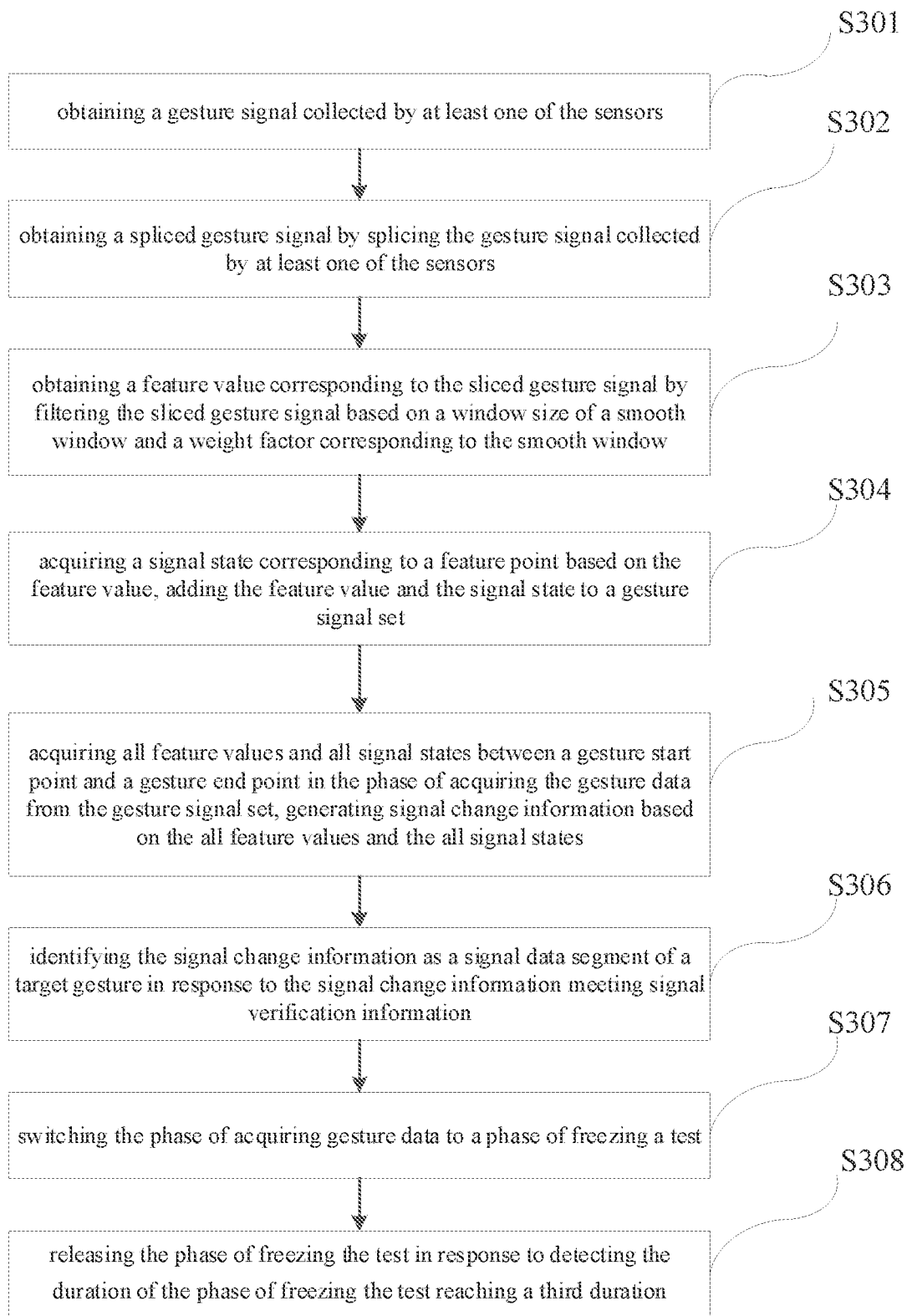
FIG. 9 illustrates a schematic flowchart of a method for acquiring gesture data provided by an embodiment of the present disclosure.

FIG. 9 illustrates a schematic flowchart of a method for acquiring gesture data provided by some embodiments of the present disclosure, applied to a terminal.

At block S301, the terminal obtains a gesture signal collected by at least one of the sensors.

In some embodiments, there may be at least one sensor provided in the terminal. The sensor may include one or more of, e.g., an accelerometer, a gyroscope, a pressure sensor, etc. When the terminal includes two or more sensors, at least two sensor may be made by different manufacturers, in some implementations.

In some embodiments, a sensor may collect gesture signals when it detects a spatial gesture input. The terminal can acquire gesture signals collected by at least one sensor. For instance, at least one sensor may output the collected gesture signal to the processor of the terminal. The processor of the terminal may acquire gesture signals collected by at least one sensor.

Optionally, when at least one sensor includes a T sensor, a Y sensor, and a U sensor, the terminal may acquire gesture signals collected by the i sensor, the y sensor, and the u sensor. The gesture data collected by the i sensor at time t obtained by the terminal may be, for example, formula (1).

$$d_i(t)=[d_{i1}, \ldots ,d_{iD_i}] \quad (1).$$

In some embodiments, $D_i$ represents the data dimension of the i sensor; $d_i(t)$ represents the gesture data collected by the i sensor at time t.

At block S302, the terminal obtains a spliced gesture signal by splicing the gesture signal collected by at least one of the sensors.

In some embodiments, when the terminal acquires the gesture signal collected by at least one sensor, the terminal may splice the gesture signal collected by the at least one sensor to obtain a spliced gesture signal.

In some embodiments, when the terminal acquires the gesture signal collected by at least one sensor at time t, the gesture signal collected by at least one sensor is spliced to obtain the spliced gesture signal at time t. The spliced gesture signal at time t may be calculated according to formula (2).

$$d(t)=[d_1(t), \ldots ,d_C(t)]=[d_{11}, \ldots ,d_{1D_1}, \ldots , d_{C1}, \ldots ,d_{CD_C}] \quad (2),$$

where C represents the number of sensors.

At block S303, the terminal obtains a feature value corresponding to the spliced gesture signal by filtering the spliced gesture signal based on a window size of a smooth window and a weight factor corresponding to the smooth window.

In some embodiments, when the terminal splices gesture signals collected by at least one sensor, the terminal may obtain the spliced gesture signals. Based on the window size of the smoothing window and the weight factor corresponding to the smoothing window, the terminal may perform smoothing and filtering processing on the spliced gesture signal. The terminal may obtain the feature value corresponding to the spliced gesture signal.

In some embodiments, the terminal can obtain the feature of the gesture signal at time t, and the terminal can obtain the feature f(t) of the gesture signal at time t defined as formula (3).

$$f(t) = \begin{cases} 0 & , t = 0 \\ \|d(t) - d(t-1)\|_2 & , t > 0 \end{cases} \quad (3)$$

Optionally, the smoothing and filtering processing on f(t) by the terminal can be defined as formula (4).

$$s((t)) = \begin{cases} 0 & , t < L \\ \sum_{m=0}^{L} w_m \cdot f(t - L + m) & , t \geq L \end{cases},$$
$$w_m = \frac{2m+1}{\sum_{m=0}^{L}(2m+1)}, 0 \leq m \leq L \quad (4)$$

where L represents the size of the smooth window, and w represents the weight of the smooth window.

In some embodiments, the terminal performs smoothing and filtering processing on the spliced gesture signal to obtain the feature value corresponding to the spliced gesture signal.

In some embodiments, when the terminal obtains the feature value corresponding to the gesture signal, it can calculate the feature value based on, e.g., signal energy, signal amplitude, signal zero-crossing rate, and the signal correlation coefficient, just to name a few. For instance, the terminal may smooth and filter the signal energy, signal amplitude, signal zero-crossing rate, and signal correlation coefficient to obtain the feature value corresponding to the gesture signal.

In some embodiments, the energy of the gesture signal is defined as formula (5).

$$E(t) = \sum_{i=1}^{D} d_i^2(t), \quad (5)$$

where $d_i(t)$ represents the i-th dimension data of gesture data d(t) at time t, and D represents the dimension of gesture data.

The gesture signal amplitude may be defined as the formula (6).

$$M(t) = \sum_{i=1}^{D} |d_i(t)|. \quad (6)$$

The zero-crossing rate of the gesture signal may be defined as the formula (7).

$$Z(t) = \frac{1}{D}\sum_D \frac{1}{2}\sum_{m=1}^{N} |\text{sgn}\,[d_i(t-N+m)] - \text{sgn}\,[d_i(t-N+m-1)]|, \quad (7)$$

where N represents the length of the zero crossing rate statistics.

The gesture signal correlation coefficient may be defined as the formula (8).

$$R(t) = \sum_{m=1}^{N} d(t-N+m-k) \cdot d(t-N+m), \quad (8)$$

where N represents the length of the correlation coefficient statistical calculation data, k represents the length of the data delay, and <·> represents a dot product.

At block S304, the terminal acquires a signal state corresponding to a feature point based on the feature value and add the feature value and the signal state to a gesture signal set.

At block S305, the terminal acquires all feature values and all signal states between a gesture start point and a gesture end point in the phase of acquiring the gesture data from the gesture signal set. At block S305, the terminal may also generate signal change information based on the all feature values and the all signal states.

At block S306, the terminal identifies the signal change information as a signal data segment of a target gesture in response to the signal change information meeting signal verification information.

In some embodiments, the signal change information may include signal change trends and lengths of signal data segment. When the terminal acquires all feature values and all signal states between the gesture start point and the gesture end point in the phase of acquiring the gesture data in the gesture signal set, the terminal may generate signal change information based on all feature values and all signal states. The signal change information may include, e.g., a signal change trend and a length of a signal data segment, just to name a few. When the terminal determines that the signal change trend meets the signal verification trend, and the length of the signal data segment meets the length of data verification, the terminal may determine that the signal change information is the signal data segment of the target gesture. The detection of the length of the signal data segment may reduce the situation that the length of the data segment does not meet the length of the data verification, while reducing inaccuracies in gesture data acquisition.

By way of example and not limitation, the length of the data verification can be, e.g., 0.9 seconds to 1.1 seconds. For instance, when the length of the signal data segment acquired by the terminal is 1 second, the terminal may determine that the signal change trend meets the signal verification trend. Moreover, when length of the signal data segment of 1 second meets the length of the data verification of 0.9 seconds to 1.1 seconds, the terminal may determine that the signal change information is the target gesture signal data segment.

At block S307, the terminal switches the phase of acquiring gesture data to a phase of freezing a test.

In some embodiments, when the signal change information meets the signal verification information, the terminal may determine that the signal change information is a signal data segment of the target gesture. When the terminal determines that the signal change information is the signal data segment of the target gesture, the terminal can divide the gesture data corresponding to the target gesture from the gesture signal set. Here, the terminal can switch the phase of acquiring the gesture data to the phase of detecting freezing.

The purpose of detecting the phase of freezing is to filter the gesture signal fluctuations caused by manual shaking (e.g., by the user) after the gesture ends. In some cases, after the gesture input ends, the sensor may collect a gesture signal due to the shaking of the hand. Here, the terminal may determine the shaking of the hand as a new target gesture based on the gesture signal. In practical applications, after each target gesture ends, there may be a pause in gesture. During the pause in gesture, the terminal may not execute new gesture actions. Therefore, the terminal may switch the phase of acquiring the gesture data to the phase of detecting freezing. The switch may filter out the noise data in the phase of the gesture end, thereby improving the accuracy of acquiring the gesture data.

At block S308, the terminal releases the phase of freezing the test in response to detecting the duration of the phase of freezing the test reaching a third duration.

In some embodiments, when the terminal switches the phase of acquiring the gesture data to the phase of detecting freezing, the terminal may acquire the duration of the phase of detecting freezing. When the terminal detects that the duration of the phase of detecting freezing reaches the third duration, the terminal can release the phase of detecting freezing. This may reduce the occurrence of the phase of detecting freezing lasting too long, thereby improving the accuracy of acquiring the gesture data. In some embodiments, the third duration may refer to a duration corresponding to the duration of the phase of detecting freezing. The third duration may not specifically refer to a certain fixed duration. Instead, the third duration may be determined based on a user's duration setting instruction.

By way of example and not limitation, the third duration may be, e.g., 0.5 seconds. When the terminal switches the phase of acquiring the gesture data to the phase of detecting freezing, the terminal may acquire the duration of the phase of detecting freezing. The continuation of the phase of detecting freezing is detected by the terminal. When the terminal detects that the duration of the phase of detection freezing reaches 0.5 seconds, the terminal may release the phase of detecting freezing.

Optionally, when the terminal switches the phase of acquiring the gesture data to the phase of detecting freezing, the terminal may start timing the phase of detecting freezing. When the terminal's timing of the phase of detecting freezing reaches a third duration, the terminal may directly release the phase of detecting freezing.

In some embodiments, the gesture signal collected by at least one sensor is spliced to obtain the spliced gesture signal. Based on the window size of the smoothing window and the weight coefficient corresponding to the smoothing window, the terminal may smooth and filter the spliced gesture signals to obtain the feature values corresponding to the spliced gesture signals. This may reduce inaccuracies caused by noise data when acquiring feature values.

Still further, when the signal change information meets the signal verification information, after determining that the signal change information is the signal data segment of the target gesture, the phase of acquiring the gesture data is switched to the phase of detecting freezing. When the duration of the phase of detecting freezing is longer than the third time length, the terminal may release the phase of detecting freezing. The termina may filter out noise data at the phase of the gesture end. This may limit the influence of sensor fluctuations and environmental noise on the gesture data, thereby increasing the accuracy of acquiring gesture data.

The following are embodiments of apparatus of the present disclosure, which can be used to implement the method embodiments of the present disclosure. For details not disclosed in the embodiments of apparatus of the present disclosure, please refer to the method embodiments of the present disclosure.

Figures 10, 11:
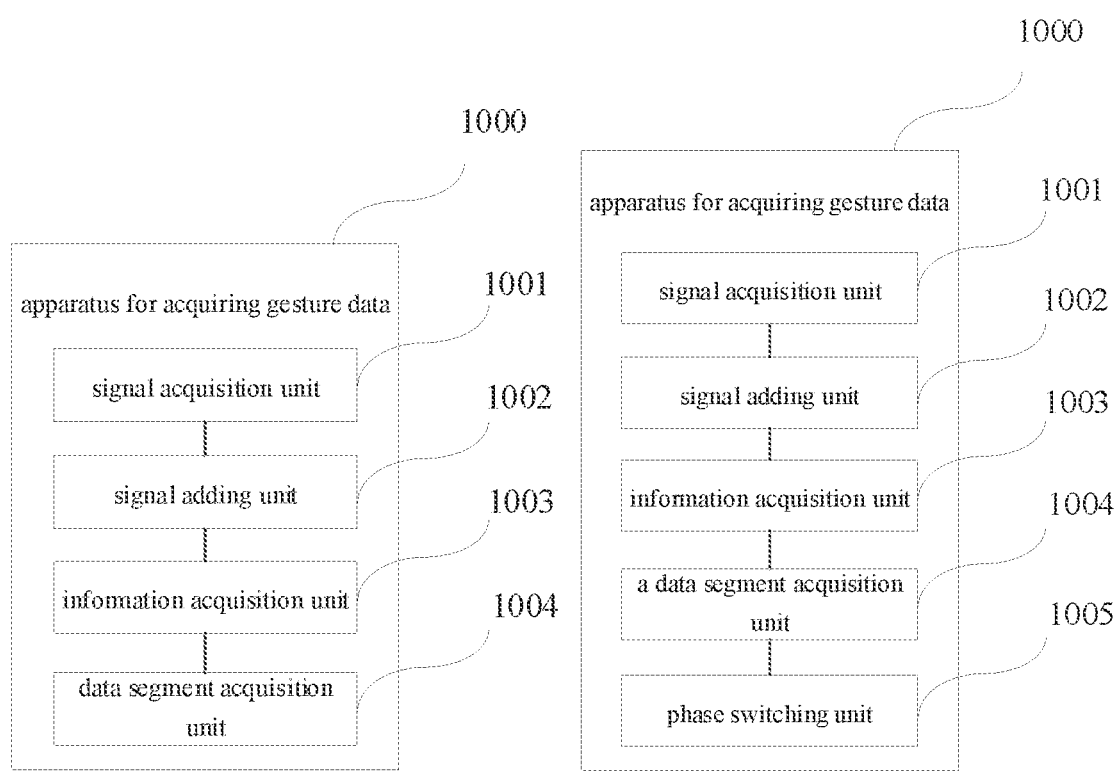
FIG. 10 illustrates a schematic structural diagram of an apparatus for acquiring gesture data provided by an embodiment of the present disclosure.
FIG. 11 illustrates a schematic structural diagram of an apparatus for acquiring gesture data provided by an embodiment of the present disclosure.

FIG. 10 illustrates a schematic structural diagram of an apparatus for acquiring gesture data according to some embodiments of the present disclosure. The apparatus for acquiring gesture data can be implemented as all or a part of the apparatus through software, hardware or a combination of the two. The apparatus for acquiring gesture data 1000 includes a signal acquisition unit 1001, a signal adding unit 1002, an information acquisition unit 1003, and a data segment acquisition unit 1004.

The signal acquisition unit 1001 is configured to acquire a gesture signal collected by a sensor, acquire a feature value corresponding to the gesture signal.

The signal adding unit 1002 is configured to acquire a signal state corresponding to a feature point based on the feature value, add the feature value and the signal state to a gesture signal set. The feature point may be a feature point in a phase of acquiring the gesture data based on the feature value.

The information acquisition unit 1003 is configured to acquire all feature values and all signal states between a gesture start point and a gesture end point in the phase of acquiring the gesture data from the gesture signal set. Information acquisition unit 1003 may generate signal change information based on the all feature values and the all signal states.

The data segment acquisition unit 1004 is configured to identify the signal change information as a signal data segment of a target gesture in response to the signal change information meeting signal verification information.

FIG. 11 illustrates a schematic structural diagram of an apparatus for acquiring gesture data according to an embodiment of the present disclosure.

As illustrated in FIG. 11, the apparatus for acquiring gesture data 1000 further includes a phase switching unit 1005 that is configured to, before acquiring a signal state corresponding to a feature point based on the feature value and adding the feature value and the signal state to a gesture signal set, determine to change from a phase of noise to the phase of acquiring gesture data in response to detecting a first feature value being greater than or equal to a first threshold in the phase of noise, and identify the first feature point corresponding to the first feature value as the gesture start point of the phase of acquiring the gesture data. Phase switching unit 1005 may determine to change from the phase of acquiring gesture data to the phase of noise in response to detecting continuously existed second feature value being less than the first threshold in the phase of acquiring gesture data. Phase switching unit 1005 may identify a third feature point corresponding to a third feature value as the gesture end point of the phase of acquiring the gesture data. In some embodiments, the third feature point may be a last feature point corresponding to the feature value greater than or equal to the first threshold before a second feature point corresponding to the second feature value.

In some embodiments, the phase of acquiring the gesture data may include a phase of the gesture start, a phase of a gesture, a phase of the gesture end. The gesture start point may be a starting point of the phase of the gesture start, and the gesture end point may be an end point of the phase of the gesture end.

In some embodiments, the phase switching unit 1005 may be configured to determine to change from a phase of noise to the phase of acquiring gesture data in response to detecting a first feature value being greater than or equal to a first threshold in the phase of noise, and identify the first feature point corresponding to the first feature value as the gesture start point of the phase of acquiring the gesture data. Phase switching unit 1005 may be configured to determine to change from the phase of noise to the phase of gesture start in response to detecting the first feature value greater than or equal to the first threshold. Phase switching unit 1005 may be configured to identify the first feature point corresponding to the first feature value as the starting point of the phase of the gesture start Phase switching unit 1005 may be configured to determine to change from the phase of the gesture start to the phase of the gesture in response to detecting a fourth feature value greater than or equal to a second threshold. Phase switching unit 1005 may be configured to identify a fourth feature point corresponding to the fourth feature value as the starting point of the phase of the gesture. In some embodiments, the starting point of the phase of the gesture may be the ending point of the phase of the gesture start, and the second threshold may be greater than the first threshold.

In some embodiments, the phase switching unit 1005 may be configured to determine to change from the phase of acquiring gesture data to the phase of noise in response to detecting continuously existed second feature value being less than the first threshold in the phase of acquiring gesture data. Phase switching unit 1005 may be configured to identifying a third feature point corresponding to a third feature value as the gesture end point of the phase of acquiring the gesture data. Phase switching unit 1005 may be configured to determine to change from the phase of the gesture to the phase of the gesture end in response to detecting a sixth feature value being less than the second threshold. Phase switching unit 1005 may be configured to identify a fifth feature point corresponding to a fifth feature value as the ending point of the phase of the gesture. In some embodiments, the fifth feature point may be a last feature point corresponding to the feature value greater than or equal to the second threshold before a sixth feature point corresponding to the sixth feature value. Phase switching unit 1005 may be configured to determine to change from the phase of gesture end to the phase of the noise in response to detecting continuously existed second feature value being less than the first threshold in the phase of the gesture end. Phase switching unit 1005 may be configured to identify the third feature point corresponding the third feature value as the ending point of the phase of the gesture end. In some embodiments, the third feature point may be a last feature point corresponding to the feature value greater than or equal to the first threshold before the second feature point corresponding to the second feature value. In some embodiments, the ending point of the phase of the gesture may be the starting point of the phase of the gesture end. In some embodiments, the second threshold may be greater than the first threshold.

In some embodiments, phase switching unit 1005 may be configured to acquire a signal state corresponding to a feature point based on the feature value, add the feature value and the signal state to a gesture signal set. Phase switching unit 1005 may be configured to set the signal state corresponding to the first feature point as a noise state in response to detecting the first feature value being less than the first threshold in the phase of the gesture start. Phase switching unit 1005 may be configured to set the signal state corresponding to the first feature point as a gesture start state in response to detecting the first feature value being greater than or equal to the first threshold and less than the second threshold. Phase switching unit 1005 may be configured to set the signal state corresponding to the first feature point as a gesture state in response to detecting the first feature value being greater than or equal to the second threshold.

In some embodiments, the signal adding unit 1002 may be configured to acquire a signal state corresponding to a feature point based on the feature value. Signal adding unit 1002 may be configured to add the feature value and the signal state to a gesture signal set. Signal adding unit 1002 may be configured to set the signal state corresponding to the third feature point as a noise state in response to detecting the third feature value being less than the first threshold in the phase of the gesture. Signal adding unit 1002 may be configured to set the signal state corresponding to the third feature point as a gesture end state in response to detecting the third feature value being greater than or equal to the first threshold and less than the second threshold. Signal adding unit 1002 may be configured to set the signal state corresponding to the third feature point as a gesture state in response to detecting the third feature value being greater than or equal to the second threshold.

In some embodiments, signal adding unit 1002 may be configured to acquire a signal state corresponding to a feature point based on the feature value, add the feature value and the signal state to a gesture signal set. Signal adding unit 1002 may be configured to set the signal state corresponding to the sixth feature point as a noise state in response to detecting the sixth feature value being less than the first threshold in the phase of the gesture end. Signal adding unit 1002 may be configured to set the signal state corresponding to the sixth feature point as a gesture end state in response to detecting the sixth feature value being greater than or equal to the first threshold and less than the second threshold. Signal adding unit 1002 may be configured to set the signal state corresponding to the sixth feature point as a gesture in response to detecting the sixth feature value being greater than or equal to the second threshold.

In some embodiments, the apparatus for acquiring gesture data may further include a signal removing unit. The signal removing unit may be configured to acquire an abnormal signal state and a normal signal state in any phase of the phase of acquiring gesture data after acquiring a signal state corresponding to a feature point based on the feature value. The signal removing unit may be configured to add the feature value and the signal state to a gesture signal set. The signal removing unit may be configured to remove all feature values and all signal states in the gesture signal set in response to a duration of the abnormal signal state is longer than a first duration, or a duration of the normal signal state is longer than a second duration.

Figure 12:
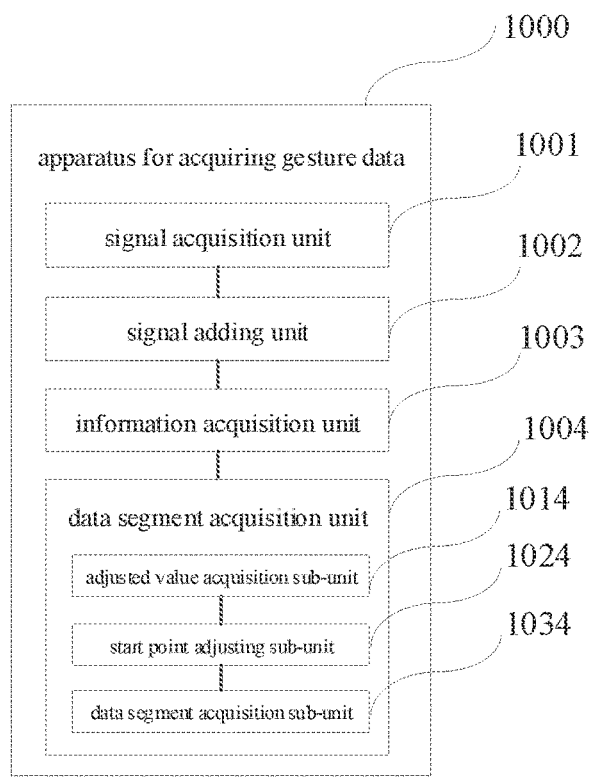
FIG. 12 illustrates a schematic structural diagram of an apparatus for acquiring gesture data provided by an embodiment of the present disclosure.

FIG. 12 illustrates a schematic structural diagram of an apparatus for acquiring gesture data provided by an embodiment of the present disclosure. As illustrated in FIG. 12, the data segment acquisition unit 1004 includes an adjusted value acquisition sub-unit 1014, a start point adjusting sub-unit 1024, and a data segment acquisition sub-unit 1034, the data segment acquisition unit 1004 is configured to identify the signal change information as a signal data segment of a target gesture in response to the signal change information meeting signal verification information.

To that end, the adjusted value acquisition sub-unit 1014 may be configured to acquire an adjusted start point value corresponding to the gesture start point in response to the signal change information meeting the signal verification information. The start point adjusting sub-unit 1024 may be configured to obtain an adjusted gesture start point by adjusting the gesture start point based on the adjusted start point value. The data segment acquisition sub-unit 1034 may be configured to identify the state change information between the adjusted gesture start point and the gesture end point as the signal data segment of a target gesture.

Figure 13:
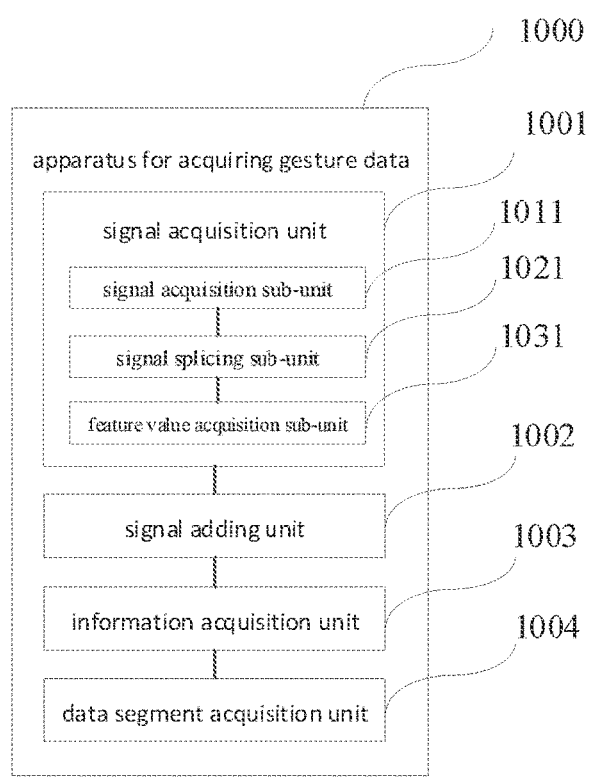
FIG. 13 illustrates a schematic structural diagram of an apparatus for acquiring gesture data provided by an embodiment of the present disclosure.

In some embodiments, illustrates a schematic structural diagram of an apparatus for acquiring gesture data provided by some embodiments of the present disclosure. As illustrated in FIG. 13, the signal acquisition unit 1001 may include a signal acquisition sub-unit 1011, a signal splicing sub-unit 1021, and a feature value acquisition sub-unit 1031. The signal acquisition unit 1001 may be configured to acquire a gesture signal collected by a sensor. Signal acquisition unit 1001 may be configured to acquire a feature value corresponding to the gesture signal.

To that end, the signal acquisition sub-unit 1011 may be configured to obtain a gesture signal acquired by at least one of the sensors. The signal splicing sub-unit 1021 may be configured to obtain a spliced gesture signal by splicing the gesture signal acquired by at least one of the sensors. The feature value acquisition sub-unit 1031 may be configured to obtain a feature value corresponding to the spliced gesture signal by filtering the spliced gesture signal based on a window size of a smooth window and a weight factor corresponding to the smooth window.

In some embodiments, a data segment acquisition unit 1004 may be configured to identify the signal change information as a signal data segment of a target gesture in response to the signal change information meeting signal verification information. The signal change information may include a trend of the signal change information and a length of the signal data segment. Data segment acquisition unit 1004 may be configured to identify the signal change information as the signal data segment of the target gesture in response to the trend of the signal change meeting a trend of signal verification and the length of the signal data segment meeting a length of data verification.

Figure 14:
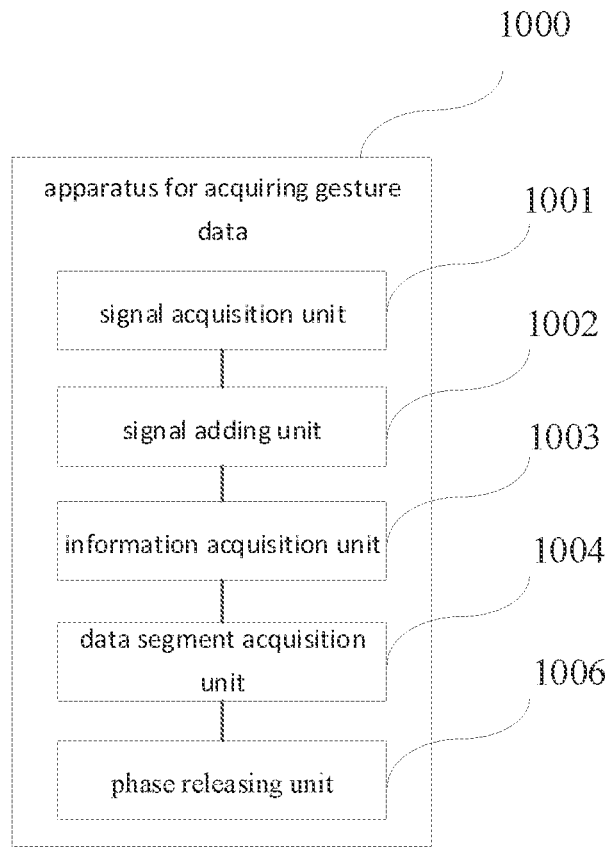
FIG. 14 illustrates a schematic structural diagram of an apparatus for acquiring gesture data provided by an embodiment of the present disclosure.

In some embodiments, according to some embodiments, FIG. 14 illustrates a schematic structural diagram of an apparatus for acquiring gesture data provided by an embodiment of the present disclosure. As illustrated in FIG. 14, the apparatus for acquiring gesture data 1000 may further include a phase releasing unit 1006. Phase releasing unit 1006 may be configured to switch the phase of acquiring gesture data to a phase of freezing a test after identifying the signal change information as a signal data segment of a target gesture in response to the signal change information meeting signal verification information. Phase releasing unit 1006 may be configured to release the phase of freezing the test in response to detecting the duration of the phase of freezing the test reaching a third duration.

In some embodiments, when the apparatus for acquiring gesture data provided in the above-mentioned embodiments executes the method for acquiring gesture data, the division of the above-mentioned functional modules is used as an example for illustration. In practical applications, the above-mentioned functions can be assigned to different functions according to needs. In some implementations, this may mean that the internal structure of the device is divided into different functional modules to complete all or part of the functions described above. In addition, the apparatus for acquiring gesture data provided by the above-mentioned embodiments and the embodiment of the method for acquiring gesture data belong to the same idea, and its implementation process can be found in the method embodiment for details, and may be repeated here.

The labels of the above embodiments of the present disclosure are for description only, and do not represent the advantages and disadvantages of the embodiments.

In some embodiments of the present disclosure, by acquiring the gesture signal collected by the sensor, the feature value corresponding to the gesture signal may be obtained. The signal state corresponding to the feature point may be obtained based on the feature value. The feature value and signal state may be added to the gesture signal set, which can be in the gesture signal collection. All feature values and all signal states between the gesture start point and gesture end point may be obtained in the phase of acquiring gesture data. Signal change information may be generated based on all feature values and all signal states. Signal verification in the signal change information may be satisfied. It may be determined that signal change information is the signal data segment of the target gesture. Therefore, when acquiring gesture data, there may be no need for human control, thereby reducing the inaccuracy of acquiring gesture data based only on the threshold. Moreover, there may be no need to manually label gesture data on the model, and the target gesture can be acquired only based on the signal change information corresponding to the target gesture collected by the sensor. The signal data segment can improve the accuracy of acquiring the gesture data, while improving the convenience of acquiring the gesture data. This may improve the user's gesture operation experience.

The embodiments of the present disclosure also provide a computer storage medium, and the computer storage medium can store a plurality of instructions, and the instructions are adapted for being loaded and executed by a processor as described in the above-mentioned embodiments shown in FIG. 3-9. For the method for acquiring gesture data, the specific execution process can refer to the specific description of the embodiments shown in FIG. 3-9, and details are not repeated here.

The embodiments of the present disclosure also provide a computer program product, the computer program product stores a plurality of instructions, and the plurality of the instructions are adapted for being loaded and executed by a processor as described in the above-mentioned embodiments shown in FIG. 3-9. For the method for acquiring gesture data, the specific execution process can refer to the specific description of the embodiments shown in FIG. 3-9, and details are not repeated here.

Figure 15:
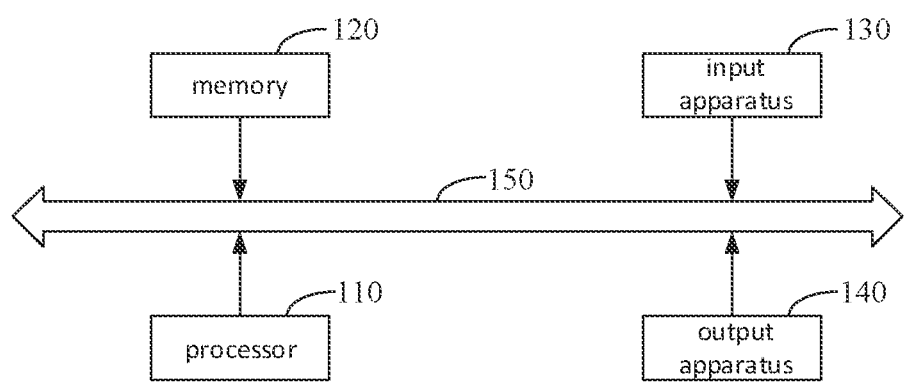
FIG. 15 illustrates a schematic structural diagram of a terminal provided in an embodiment of the present disclosure.

FIG. 15 illustrates a schematic structural diagram of a terminal provided in an embodiment of the present disclosure. The terminal in the present disclosure may comprise one or more components. For instance, the terminal may include, e.g., processor 110, memory 120, input apparatus 130, output apparatus 140, and bus 150. The processor 110, the memory 120, the input apparatus 130, and the output apparatus 140 may be connected by the bus 150. The processor 110 loads and executes the method for acquiring gesture data as described in the above-mentioned embodiments illustrated in FIG. 3-9. For the method for acquiring gesture data, the specific execution process can refer to the specific description of the embodiments shown in FIG. 3-9, and details are not repeated here.

The processor 110 may include one or more processing cores. The processor 110 uses various interfaces and lines to connect various parts of the entire terminal, and executes various functions and process data of the terminal 100 by running or executing instructions, programs, code sets or instruction sets stored in the memory 120 and calling data stored in the memory 120. Optionally, the processor 110 may adapt at least one of digital signal processing (DSP), field-programmable gate array (FPGA), programmable logic array (PLA) to implement. The processor 110 may integrate one or a combination of a central processing unit (CPU), a graphics processing unit (GPU), a modem, and the like. In some embodiments, the CPU mainly handles the operating system, user interface and application programs, etc. The GPU is used to render and draw the displayed content; the modem is used to handle wireless communication. It can be understood that the above-mentioned modem may not be integrated into the processor 110, but may be implemented by a communication chip alone.

The memory 120 may include a random-access memory, RAM, and may also include a read-only memory, ROM. Optionally, the memory 120 includes a non-transitory computer-readable storage medium. The memory 120 may be used to store instructions, programs, codes, codes set, or instructions set. The memory 120 may include a program storage area and a data storage area, wherein the program storage area may store instructions for implementing an operating system, instructions for implementing at least one function (such as a touch function, a sound playback function, an image playback function, etc.), instructions for implementing the following method embodiments, etc., the operating system can be an Android system, including a system based on the deep development of the Android system, an iOS system developed by Apple, including a system based on the deep development of the iOS system, or other systems. The storage data area can also store data created by the terminal during use, such as phonebook, audio and video data, chat record data, etc.

Figure 16:
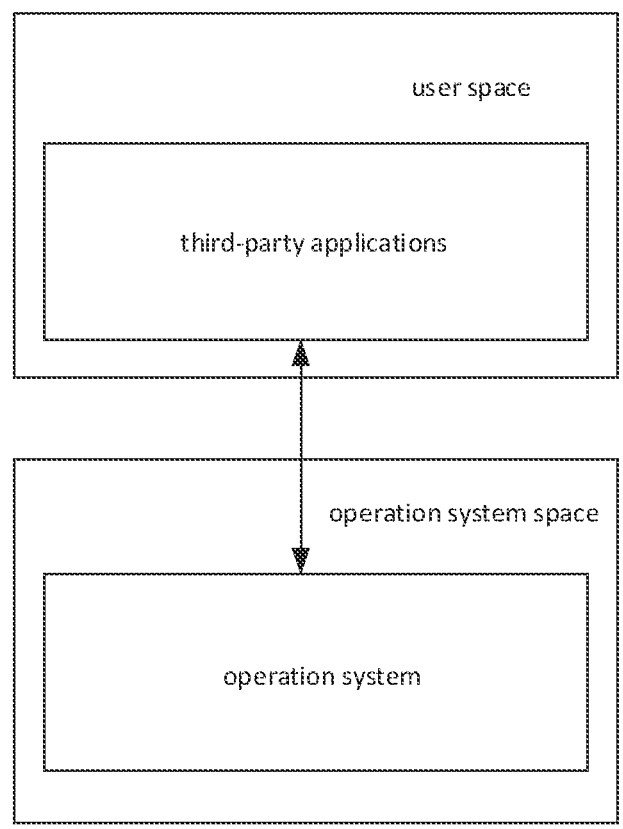
FIG. 16 illustrates a schematic structural diagram of the operating system and user space provided by the embodiment of the present disclosure.

As illustrated in FIG. 16, the memory 120 can be divided into an operating system space and a user space. The operating system runs in the operating system space, and native and third-party applications run in the user space. In order to ensure that different third-party application programs can achieve better running effects, the operating system allocates corresponding system resources for different third-party application programs. However, different application scenarios in the same third-party application have different requirements for system resources. For example, in the local resource loading scenario, the third-party application has higher requirements for disk reading speed; in the animation rendering scenario, the second Three-party applications have higher requirements on GPU performance. However, the operating system and third-party applications are independent of each other, and the operating system often cannot perceive the current application scenarios of the third-party applications in a timely manner, resulting in the inability of the operating system to perform targeted system resource adaptation according to the specific application scenarios of the third-party applications.

To enable the operating system to distinguish the application scenarios of third-party applications, the communication between third-party applications and the operating system is required so that the operating system can obtain the current scenario information of third-party applications at any time and adapt system resources based on the current scenario.

Figure 17:
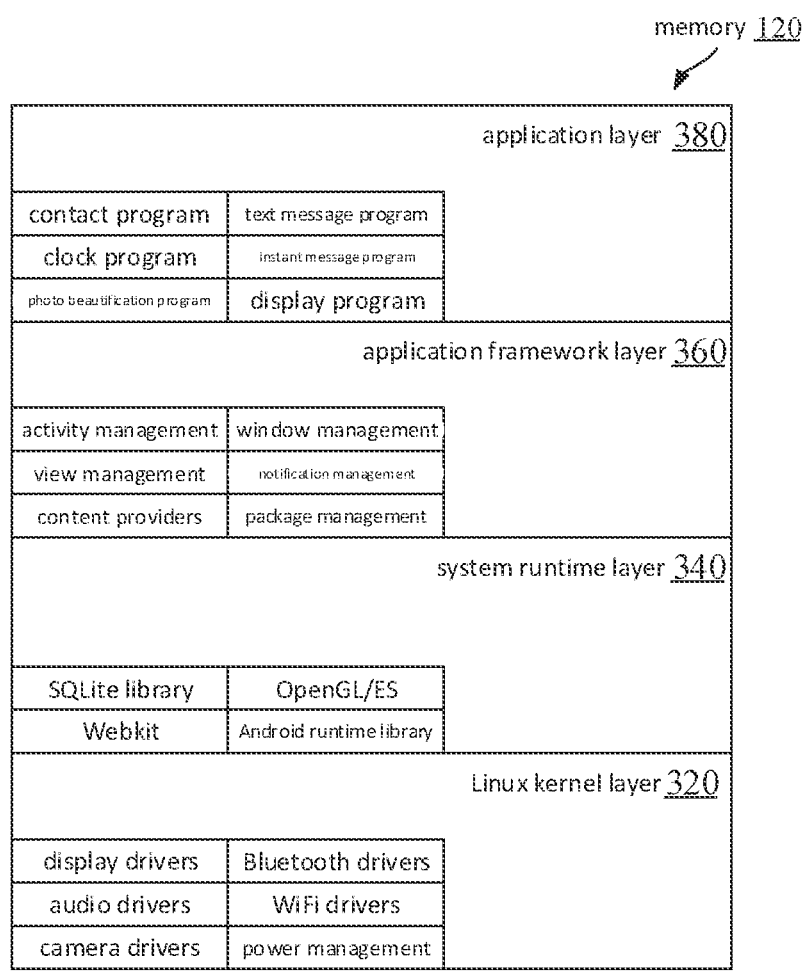
FIG. 17 illustrates an architecture diagram of the Android operating system in FIG. 15.

Taking the operating system as an Android system as an example, the programs and data stored in the memory 120 are illustrated in FIG. 17, the memory 120 can store a Linux kernel layer 320, a system runtime library layer 340, an application framework layer 360, and an application layer 380, wherein, the Linux kernel layer 320, the system runtime layer 340, and the application framework layer 360 belong to the operating system space, and the application layer 380 belongs to the user space. The Linux kernel layer 320 provides underlying drivers for various hardware of the terminal, such as display drivers, audio drivers, camera drivers, Bluetooth drivers, Wi-Fi drivers, power management, etc. The system runtime layer 340 provides main feature support for the Android system through some C/C++ libraries. For example, the SQLite library provides database support, the OpenGL/ES library provides 3D drawing support, and the Webkit library provides browser kernel support. The system runtime library layer 340 also provides an Android runtime library, which mainly provides some core libraries, allowing developers to use the Java language to write Android applications. The application framework layer 360 provides various APIs that may be used when building applications. Developers can also use these APIs to build their own applications, such as activity management, window management, view management, notification management, content providers, package management, call management, resource management, location management. There is at least one application program running in the application layer 380, and these application programs can be native application programs that come with the operating system, such as a contact program, a text message program, a clock program, a camera application, etc.; they can also be third-party applications developed by a third-party developer, such as game applications, instant messaging programs, photo beautification programs, gesture data acquisition programs, etc.

Figure 18:
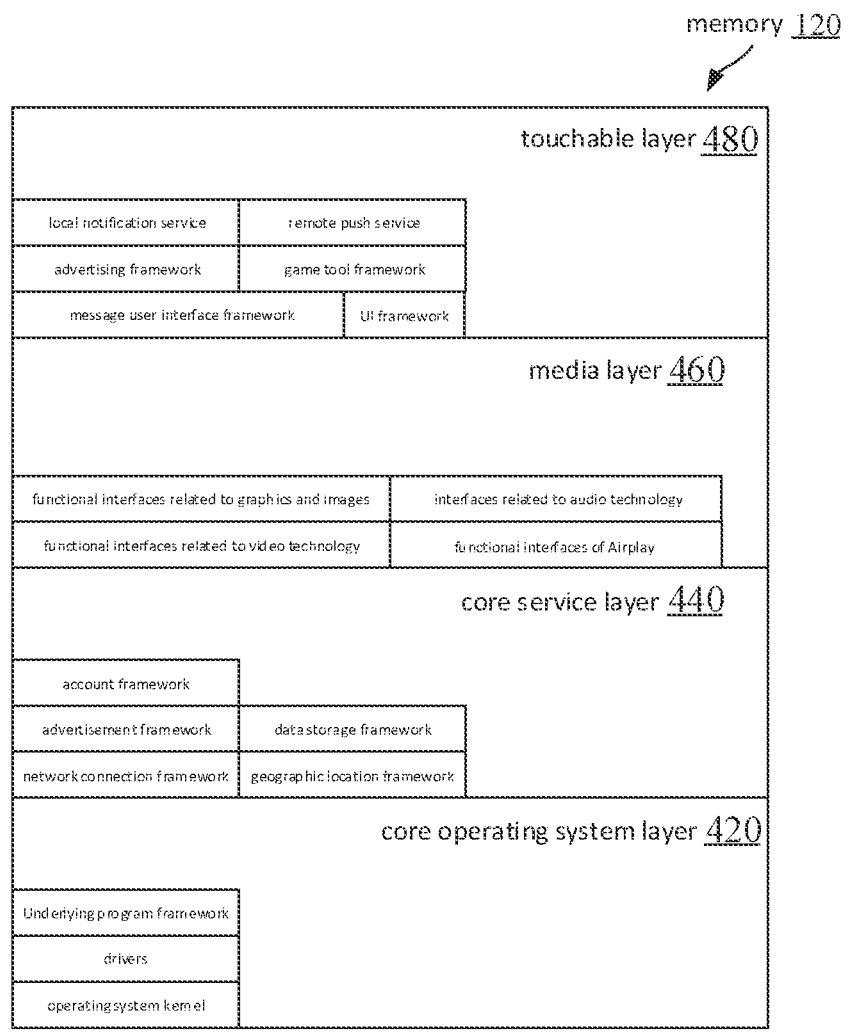
FIG. 18 illustrates an architecture diagram of the IOS operating system in FIG. 15.

Taking the operating system as an iOS system as an example, the programs and data stored in the memory 120 are shown in FIG. 18. The iOS system includes: a core operating system layer 420 (Core OS layer), a core service layer 440 (Core Services layer), a media layer 460 (Media layer), a touchable layer 480 (Cocoa Touch Layer). The core operating system layer 420 includes an operating system kernel, drivers, and underlying program frameworks. These underlying program frameworks provide functions closer to hardware for use by the program frameworks located in the core service layer 440. The core service layer 440 provides system services and/or program frameworks required by applications, such as foundation framework, account framework, advertisement framework, data storage framework, network connection framework, geographic location framework, exercise framework and so on. The media layer 460 provides audio-visual interfaces for applications, such as interfaces related to graphics and images, interfaces related to audio technology, interfaces related to video technology, and wireless playback (AirPlay) interfaces of audio and video transmission technology. The touchable layer 480 provides various common interface-related frameworks for application development, and the touchable layer 480 is responsible for the user's touch interaction operation on the terminal. Such as local notification service, remote push service, advertising framework, game tool framework, message user interface (User Interface, UI) framework, user interface UIKit framework, map framework and so on.

In the frameworks illustrated in FIG. 16, frameworks related to most applications include, but are not limited to: the basic framework in the core service layer 440 and the UIKit framework in the touchable layer 480. The basic framework provides many basic object classes and data types, and provides the most basic system services for all applications, regardless of UI. The class provided by the UIKit framework is a basic UI class library for creating a touch-based user interface. iOS applications can provide UI based on the UIKit framework, so it provides the infrastructure of the application for building user interfaces, drawing, processing and user interaction events, respond to gestures, etc.

In some embodiments, the method and principle of implementing the data communication between the third-party application program and the operating system in the iOS system can refer to the Android system.

In some embodiments, the input device 130 is used for receiving input instructions or data, and the input device 130 includes but not limited to a keyboard, a mouse, a camera, a microphone or a touch device. The output device 140 is used to output instructions or data, and the output device 140 includes but not limited to a display device and a speaker. In one example, the input 130 and output 140 can be combined. The input 130 and output 140 are touch displays that receive the user's touch operations on or near them with fingers, stylus, and any other suitable object, as well as display the user interface for each application. The touch screen is usually set on the front panel of the terminal. Touch screens can be designed as full screens, curved screens or special-shaped screens. The touch display screen can also be designed as a combination of a full screen and a curved screen, or a combination of a special-shaped screen and a curved screen, which is not limited in this embodiment of the present application.

In some embodiments, those skilled in the art can understand that the structure of the terminal shown in the above figures does not constitute a limitation on the terminal, and the terminal may include more or less components than those shown in the figure, or combine certain components, or different component arrangements. For example, the terminal also includes components such as a radio frequency circuit, an input unit, a sensor, an audio circuit, a wireless fidelity (WiFi) module, a power supply, and a Bluetooth module.

In some embodiments of the present disclosure, the execution subject of each step may be the terminal described above. Optionally, each step is executed by an operating system of the terminal. The operating system may be an Android system, an iOS system, or other operating systems, which is not limited in this embodiment of the present application.

The terminal of the embodiments of the present disclosure may also be equipped with a display device, which may be various devices capable of displaying functions, such as: cathode ray tube display (CR), light-emitting diode display (LED), electronic ink screen, liquid crystal display (LCD), plasma display panel (PDP), etc. The user can use the display device on the terminal 100 to view information such as displayed text, images, and videos. The terminal can be a smart phone, a tablet computer, a game device, an AR (Augmented Reality) device, a car, a data storage device, an audio playback device, a video playback device, a notebook, a desktop computing device, a wearable device such as an electronic watch, electronic glasses, electronic helmets, electronic bracelets, electronic necklaces, electronic clothing and other equipment.

Those skilled in the art can clearly understand that the technical solution of the present disclosure can be implemented by means of software and/or hardware. "Unit" and "module" in this disclosure refer to software and/or hardware that can complete specific functions independently or in cooperation with other components, where the hardware can be, for example, Field-ProgrammaBLE Gate Array (FPGA), Integrated Circuit (IC), etc.

In some embodiments, for the foregoing method embodiments, for the sake of simple description, they are expressed as a series of action combinations, but those skilled in the art should know that the present application is not limited by the described action sequence. Depending on the application, certain steps may be performed in other orders or simultaneously. Secondly, those skilled in the art should also know that the embodiments described in the specification belong to preferred embodiments, and the actions and modules involved are not necessarily required by this application.

In some embodiments, the descriptions of each embodiment have their own emphases, and for parts not described in detail in a certain embodiment, reference may be made to relevant descriptions of other embodiments.

In some embodiments provided in this disclosure, it should be understood that the disclosed device can be implemented in other ways. For example, the device embodiments described above are only illustrative. For example, the division of the units is only a logical function division. In actual implementation, there may be other division methods. For example, multiple units or components can be combined or can be integrated into another system, or some features may be ignored, or not implemented. In another point, the mutual coupling or direct coupling or communication connection shown or discussed may be through some service interfaces, and the indirect coupling or communication connection of devices or units may be in electrical or other forms.

The units described as separate components may or may not be physically separated, and the components shown as units may or may not be physical units, that is, they may be located in one place, or may be distributed to multiple network units. Part or all of the units can be selected according to actual needs to achieve the purpose of the solution of this embodiment.

In some embodiments, each functional unit in each embodiment of the present application may be integrated into one processing unit, each unit may exist separately physically, or two or more units may be integrated into one unit. The above-mentioned integrated units can be implemented in the form of hardware or in the form of software functional units.

If the integrated unit is implemented in the form of a software function unit and sold or used as an independent product, it can be stored in a computer-readable memory. Based on this understanding, the technical solution of the present disclosure is essentially or part of the contribution to the prior art, or all or part of the technical solution can be embodied in the form of a software product, and the computer software product is stored in a memory. Several instructions are included to make a computer device (which may be a personal computer, server or network device, etc.) execute all or part of the steps of the methods described in the various embodiments of the present application. The above-mentioned memory includes: U disk, Read-Only Memory (ROM), Random Access Memory (RAM), mobile hard disk, magnetic disk or optical disk, and other media capable of storing program codes.

Those of ordinary skill in the art can understand that all or part of the steps in the various methods of the above-mentioned embodiments can be completed by entering a program to instruct related hardware. The program can be stored in a computer-readable memory, and the memory can include: flash memory disk, Read-Only Memory (ROM), Random Access Memory (RAM), magnetic disk or optical disk, etc.

What is described above is only an embodiment of the present disclosure, and should not limit the scope of the present disclosure. That is, all equivalent changes and modifications made according to the teachings of the present disclosure still fall within the scope of the present disclosure. Other embodiments of the disclosure may be readily apparent to those skilled in the art from consideration of the specification and practice of the disclosure herein. This disclosure is intended to cover any modification, use or adaptation of the present disclosure, and these modifications, uses or adaptations follow the general principles of the present disclosure and include common knowledge or conventional technical means in the technical field not described in the present disclosure. The specification and examples are to be considered exemplary only, with the scope and spirit of the present disclosure defined by the claims.

What is claimed is:

1. A method for acquiring gesture data, comprising:
   acquiring a gesture signal collected by a sensor;
   acquiring a feature value corresponding to the gesture signal;
   acquiring a signal state corresponding to a feature point based on the feature value;
   adding the feature value and the signal state to a gesture signal set, the feature point being a feature point in a phase of acquiring the gesture data based on the feature value;
   acquiring all feature values and all signal states between a gesture start point and a gesture end point in the phase of acquiring the gesture data from the gesture signal set;
   generating signal change information based on the all feature values and the all signal states; and
   in response to the signal change information meeting signal verification information, identifying the signal change information as a signal data segment of a target gesture.

2. The method of claim 1, before the acquiring the signal state corresponding to the feature point based on the feature value, the adding the feature value and the signal state to a gesture signal set, the method further comprises:
   in response to detecting a first feature value greater than or equal to a first threshold in a phase of noise, determining to change from a phase of noise to a phase of acquiring gesture data;
   identifying a first feature point corresponding to the first feature value as the gesture start point of the phase of acquiring the gesture data;
   in response to detecting a second feature value less than the first threshold in the phase of acquiring gesture data, determining to change from the phase of acquiring gesture data to the phase of noise; and
   identifying a third feature point corresponding to a third feature value as the gesture end point of the phase of acquiring the gesture data,
   wherein the third feature point is a last feature point corresponding to the feature value greater than or equal to the first threshold before a second feature point corresponding to the second feature value.

3. The method of claim 2, wherein:
   the phase of acquiring the gesture data includes a phase of a gesture start, a phase of a gesture, and a phase of a gesture end, the gesture start point is a starting point of the phase of the gesture start, and the gesture end point is an end point of the phase of the gesture end.

4. The method of claim 3, wherein, in response to detecting a first feature value being greater than or equal to a first threshold in the phase of noise, the determining to change from a phase of noise to the phase of acquiring gesture data comprises:

in response to detecting the first feature value greater than or equal to the first threshold, determining to change from the phase of noise to the phase of the gesture start, and; and in response to detecting a fourth feature value greater than or equal to a second threshold, determining to change from the phase of the gesture start to the phase of the gesture, wherein the starting point of the phase of the gesture is the ending point of the phase of the gesture start, and wherein the second threshold is greater than the first threshold.

5. The method of claim 4, wherein the identifying the first feature point corresponding to the first feature value as the gesture start point of the phase of acquiring the gesture data comprises:

identifying the first feature point corresponding to the first feature value as the starting point of the phase of the gesture start; and identifying a fourth feature point corresponding to the fourth feature value as the starting point of the phase of the gesture.

6. The method of claim 4, wherein, in response to detecting the second feature value being less than the first threshold in the phase of acquiring gesture data, the determining to change from the phase of acquiring gesture data to the phase of noise comprises:

determining to change from the phase of the gesture to the phase of the gesture end in response to detecting a sixth feature value being less than the second threshold; and determining to change from the phase of the gesture end to the phase of the noise in response to detecting continuously existed second feature value being less than the first threshold in the phase of the gesture end, wherein, the ending point of the phase of the gesture is the starting point of the phase of the gesture end, the second threshold is greater than the first threshold.

7. The method of claim 6, wherein the identifying a third feature point corresponding to a third feature value as the gesture end of the phase of acquiring the gesture data comprises:

identifying a fifth feature point corresponding to a fifth feature value as the ending point of the phase of the gesture, the fifth feature point being a last feature point corresponding to the feature value greater than or equal to the second threshold before a sixth feature point corresponding to the sixth feature value; and identifying the third feature point corresponding the third feature value as the ending point of the phase of the gesture end, the third feature point being a last feature point corresponding to the feature value greater than or equal to the first threshold before the second feature point corresponding to the second feature value.

8. The method of claim 7, wherein the acquiring a signal state corresponding to a feature point based on the feature value comprises:

in response to detecting the sixth feature value being less than the first threshold in the phase of the gesture end, setting the signal state corresponding to the sixth feature point as a noise state;

in response to detecting the sixth feature value being greater than or equal to the first threshold and less than the second threshold, setting the signal state corresponding to the sixth feature point as a gesture end state; and in response to detecting the sixth feature value being greater than or equal to the second threshold, setting the signal state corresponding to the sixth feature point as a gesture.

9. The method of claim 4, wherein the acquiring a signal state corresponding to a feature point based on the feature value comprises:

in response to detecting the first feature value being less than the first threshold in the phase of the gesture start, setting the signal state corresponding to the first feature point as a noise state;

in response to detecting the first feature value being greater than or equal to the first threshold and less than the second threshold, setting the signal state corresponding to the first feature point as a gesture start state; and in response to detecting the first feature value being greater than or equal to the second threshold, setting the signal state corresponding to the first feature point as a gesture state.

10. The method of claim 4, wherein the acquiring the signal state corresponding to a feature point based on the feature value comprises:

in response to detecting the third feature value being less than the first threshold in the phase of the gesture, setting the signal state corresponding to the third feature point as a noise state;

in response to detecting the third feature value being greater than or equal to the first threshold and less than the second threshold, setting the signal state corresponding to the third feature point as a gesture end state; and in response to detecting the third feature value being greater than or equal to the second threshold, setting the signal state corresponding to the third feature point as a gesture state.

11. The method of claim 1, wherein the identifying the signal change information as the signal data segment of the target gesture in response to the signal change information meeting signal verification information comprises:

in response to the signal change information meeting the signal verification information, acquiring an adjusted start point value corresponding to the gesture start point;

obtaining an adjusted gesture start point by adjusting the gesture start point based on the adjusted start point value; and identifying state change information between the adjusted gesture start point and the gesture end point as the signal data segment of a target gesture.

12. The method of claim 1, wherein:

the acquiring the gesture signal collected by the sensor comprises:

obtaining a gesture signal collected by at least one of the sensors; and obtaining a spliced gesture signal by splicing the gesture signal collected by at least one of the sensors, and the acquiring the feature value corresponding to the gesture signal comprises:
obtaining the feature value corresponding to the spliced gesture signal by filtering the spliced gesture signal based on a window size of a smooth window and a weight factor corresponding to the smooth window.

13. A terminal, comprising:
one or more processors; and
one or more memories configured to store instructions which, when executed by the one or more processors, cause the one or more processors to:
acquire a gesture signal collected by a sensor;
acquire a feature value corresponding to the gesture signal;
acquire a signal state corresponding to a feature point based on the feature value;
add the feature value and the signal state to a gesture signal set;
acquire all feature values and all signal states between a gesture start point and a gesture end point in a phase of acquiring gesture data from the gesture signal set;
generate signal change information based on the all feature values and the all signal states; and
identify the signal change information as a signal data segment of a target gesture in response to the signal change information meeting signal verification information.

14. The terminal of claim 13, wherein the instructions which, when executed by the one or more processors, cause the one or more processors further to:
in response to detecting a first feature value being greater than or equal to a first threshold in a phase of noise, determine to change from a phase of noise to the phase of acquiring gesture data;
identify the first feature point corresponding to the first feature value as the gesture start point of the phase of acquiring the gesture data;
in response to detecting continuously existed second feature value being less than the first threshold in the phase of acquiring gesture data, determine to change from the phase of acquiring gesture data to the phase of noise; and
identify a third feature point corresponding to a third feature value as the gesture end point of the phase of acquiring the gesture data,
wherein the third feature point is a last feature point corresponding to the feature value greater than or equal to the first threshold before a second feature point corresponding to the second feature value.

15. The terminal of claim 13, wherein, to identify the signal change information as a signal data segment of a target gesture in response to the signal change information meeting signal verification information, the instructions, which when executed by the one or more processors, cause the one or more processors to:
in response to the signal change information meeting the signal verification information, acquire an adjusted start point value corresponding to the gesture start point;
obtain an adjusted gesture start point by adjusting the gesture start point based on the adjusted start point value; and
identify state change information between the adjusted gesture start point and the gesture end point as the signal data segment of a target gesture.

16. The terminal of claim 13, wherein:
to acquire the gesture signal collected by the sensor, the instructions, which when executed by the one or more processors, cause the one or more processors to:
obtain a gesture signal acquired by the sensor; and
obtain a spliced gesture signal by splicing the gesture signal acquired by the sensor, and
to acquire the feature value corresponding to the gesture signal, the instructions, which when executed by the one or more processors, cause the one or more processors to:
obtain a feature value corresponding to the spliced gesture signal by filtering the spliced gesture signal based on a window size of a smooth window and a weight factor corresponding to the smooth window.

17. The terminal of claim 13, wherein the instructions which, when executed by the one or more processors, cause the one or more processors to:
switch a phase of acquiring gesture data to a phase of freezing a test; and
in response to detecting a duration of the phase of freezing the test reaching a third duration, release the phase of freezing the test.

18. A non-transitory computer-readable storage medium having stored instructions that is executed by a processor of a terminal, cause the terminal to:
acquire a gesture signal collected by a sensor;
acquire a feature value corresponding to the gesture signal;
acquire a signal state corresponding to a feature point based on the feature value;
add the feature value and the signal state to a gesture signal set, the feature point being a feature point in a phase of acquiring gesture data based on the feature value;
acquire all feature values and all signal states between a gesture start point and a gesture end point in the phase of acquiring the gesture data from the gesture signal set;
generate signal change information based on the all feature values and the all signal states; and
in response to the signal change information meeting signal verification information, identify the signal change information as a signal data segment of a target gesture.

19. The non-transitory computer-readable storage medium of claim 18, wherein the instructions which, when executed by the processor of the terminal, cause the terminal further to:
in response to detecting a first feature value being greater than or equal to a first threshold in a phase of noise, determine to change from a phase of noise to the phase of acquiring gesture data;
identify the first feature point corresponding to the first feature value as the gesture start point of the phase of acquiring the gesture data;
in response to detecting continuously existed second feature value being less than the first threshold in the phase of acquiring gesture data, determine to change from the phase of acquiring gesture data to the phase of noise; and
identify a third feature point corresponding to a third feature value as the gesture end point of the phase of acquiring the gesture data,
wherein the third feature point is a last feature point corresponding to the feature value greater than or equal to the first threshold before a second feature point corresponding to the second feature value.

20. The non-transitory computer-readable storage medium of claim 18, wherein, to identify the signal change information as a signal data segment of a target gesture in response to the signal change information meeting signal verification information the instructions which, when executed by the processor of the terminal, cause the terminal to:
- in response to the signal change information meeting the signal verification information, acquire an adjusted start point value corresponding to the gesture start point;
- obtain an adjusted gesture start point by adjusting the gesture start point based on the adjusted start point value; and
- identify state change information between the adjusted gesture start point and the gesture end point as the signal data segment of a target gesture.

* * * * *